(12) United States Patent
Huang et al.

(10) Patent No.: US 12,156,141 B2
(45) Date of Patent: Nov. 26, 2024

(54) UPLINK POWER CONTROL METHOD AND DEVICE

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN); Qiubin Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 217 days.

(21) Appl. No.: 17/293,195

(22) PCT Filed: Nov. 12, 2019

(86) PCT No.: PCT/CN2019/117458
§ 371 (c)(1),
(2) Date: May 12, 2021

(87) PCT Pub. No.: WO2020/098631
PCT Pub. Date: May 22, 2020

(65) Prior Publication Data
US 2022/0007298 A1    Jan. 6, 2022

(30) Foreign Application Priority Data

Nov. 12, 2018 (CN) .......................... 201811341515.2

(51) Int. Cl.
*H04W 52/14* (2009.01)
*H04B 7/0456* (2017.01)
*H04W 52/40* (2009.01)

(52) U.S. Cl.
CPC ........ *H04W 52/146* (2013.01); *H04B 7/0456* (2013.01); *H04W 52/40* (2013.01)

(58) Field of Classification Search
CPC .. H04W 52/146; H04W 52/40; H04B 7/0456; H04B 7/0478
See application file for complete search history.

(56) References Cited

U.S. PATENT DOCUMENTS

| 10,389,422 B2* | 8/2019 | Muruganathan | H04B 7/0617 |
| 2014/0071903 A1* | 3/2014 | Sorrentino | H04W 52/54 |
| | | | 370/329 |

(Continued)

FOREIGN PATENT DOCUMENTS

| CN | 102413555 A | 4/2012 |
| CN | 104619000 A | 5/2015 |

(Continued)

OTHER PUBLICATIONS

Chinese Office Action dated Sep. 29, 2020 for Application No. CN 201811341515.2.
Catt, "Remaining issues on codebook based UL transmission", Agenda Item 7.1.2.1.2, 3GPP TSG RAN WG1 Meeting #93, R1-1806276, Busan, Korea, May 21-25, 2018.

(Continued)

*Primary Examiner* — John J Lee
(74) *Attorney, Agent, or Firm* — Harness, Dickey & Pierce, P.L.C.

(57) ABSTRACT

An uplink power control method and device are provided. The method includes: receiving first indication information sent by a base station, wherein the first indication information is used to indicate an uplink power control rule for an uplink signal; determining a transmission power of the uplink signal according to the uplink power control rule indicated by the first indication information.

16 Claims, 3 Drawing Sheets

(56) References Cited

U.S. PATENT DOCUMENTS

| | | | |
|---|---|---|---|
| 2014/0126530 A1* | 5/2014 | Siomina | H04L 5/0073 370/330 |
| 2016/0020837 A1* | 1/2016 | Schober | H04B 7/0469 375/267 |
| 2018/0227934 A1* | 8/2018 | Yang | H04W 52/146 |
| 2019/0037502 A1* | 1/2019 | Tang | H04L 5/14 |
| 2019/0280757 A1* | 9/2019 | Yang | H04L 5/0048 |

FOREIGN PATENT DOCUMENTS

| | | |
|---|---|---|
| CN | 107277908 A | 10/2017 |
| CN | 107690179 A | 2/2018 |
| CN | 108702693 A | 10/2018 |
| CN | 111050390 A | 4/2020 |

OTHER PUBLICATIONS

Catt, "Remaining issues on non-codebook based UL transmission", Agenda Item 7.1.2.1.3, 3GPP TSG RAN WG1 Meeting #93, R1-1806277, Busan, Korea, May 21-25, 2018.

Catt, "Consideration on full transmission power of UL", Agenda Item 7.2.8.4, 3GPP TSG RAN WG1 Meeting #94bis, R1-1810557, Chengdu, China, Oct. 8-12, 2018.

Written Opinion and International Search Report dated May 11, 2021 for International Application No. PCT/CN2019/117458.

Catt, "Discussion on remaining detailed of codebook based UL transmission", Agenda Item 7.2.1.2, 3GPP TSG RAN WG1 Meeting #91, R1-1720178, Reno, USA, Nov. 27-Dec. 1, 2017.

Ericsson, "Power control for UL MIMO", Agenda Item 7.1.6.3, 3GPP TSG RAN WG1 Meeting #92bis, R1-1805205, Sanya, China, Apr. 16-20, 2018.

\* cited by examiner

UPLINK POWER CONTROL METHOD AND DEVICE

CROSS-REFERENCE TO RELATED APPLICATIONS

This application is a U.S. national phase application of a PCT Application No. PCT/CN2018/117458 filed on Nov. 12, 2019, which claims priority to Chinese Application No. 201811341515.2, filed Nov. 12, 2018, the entire contents of each of which are hereby incorporated by reference.

TECHNICAL FIELD

The present disclosure relates to the field of communications technologies, in particular to an uplink power control method and an uplink power control device.

BACKGROUND

A codebook-based uplink transmission solution is a multi-antenna transmission technology in which an uplink transmission precoding matrix is determined based on a fixed codebook. In a fifth-generation New Radio Access Technology (5G NR) system, a basic principle of a codebook-based uplink transmission solution is similar to that of an uplink spatial multiplexing technology in a long-term evolution (LTE) system, however a codebook used and a precoding indication manner are different in the two technologies. As shown in FIG. 1, in the NR system, a flow of the codebook-based uplink transmission solution includes following.

1) A user equipment (UE) sends a Sounding Reference Signal (SRS) to a base station for acquiring Channel State Information for the codebook-based uplink transmission solution.

2) The base station performs uplink channel detection according to the SRS sent by the UE, performs resource scheduling on the UE, and determines SRS resources corresponding to uplink transmission, the number of layers of uplink transmission and a precoding matrix, and further determines a Modulation and Coding Scheme (MCS) level of uplink transmission according to the precoding matrix and the channel information, and then the base station notifies, to the UE, resource allocation for a Physical Uplink Shared Channel (PUSCH) and a corresponding MCS level, Transmit Precoding Matrix Indicator (TPMI), the number of transmission layers and a corresponding SRS resource indicator (SRI).

3) The UE performs modulation and coding on data according to the MCS level indicated by the base station, determines, based on the indicated SRI, the TPMI and the number of transmission layers, the precoding matrix and the number of transmission layers used in transmission of the data, and then performs precoding and transmission on the data. A same precoding method is used for both a demodulation reference signal of the PUSCH and the data of PUSCH.

4) The base station estimates an uplink channel based on the demodulation reference signal, and performs data detection.

Characteristics of transmission antenna and radio frequency of multiple-input multiple-output (MIMO) transmission of UE are quite different from those of the base station, and correlation characteristics between antennas should be fully considered in codebook design. When two antenna ports satisfy a coherence condition, the UE may simultaneously perform data transmission of the same layer using the two antenna ports through precoder, so as to obtain an array gain. However, due to influence from a mutual coupling effect of antenna elements, difference between feedlines, variations of a phase and a gain of an amplifier in an RF path, and the like, there are inevitably differences, in aspects of a power and a phase, between the antenna ports of an actual UE. Due to limitation in a cost and design, not all UEs may calibrate each antenna port to an extent that coherent transmission requirements are met. For a UE that cannot achieve coherent transmission of antennas, there may be a large difference between a phase difference between the antennas of UE when the base station calculates the TPMI and a phase difference between antennas when the UE performs PUSCH transmission after receiving the TPMI. If the TPMI indicates that antennas that cannot achieve coherent transmission are used for transmission of the same data layer, an optimal uplink transmission precoder of the terminal may not be the precoder indicated by the TPMI, that is, the terminal cannot obtain a better performance by performing PUSCH transmission through the precoder indicated by the TPMI by the base station.

The NR system defines three antenna coherent transmission capabilities of the UE:

1) full-coherent: all antennas can transmit coherently;
2) partial-coherent: antennas within a same coherent transmission group can transmit coherently, and antennas in different coherent transmission groups cannot transmit coherently, and each coherent transmission group includes two antennas;
3) non-coherent: no antenna can transmit coherently.

An antenna coherent transmission capability of the UE is indicated by codebook subset restriction supported by the UE. Codebook subset restriction supported by a UE in 3GPP R15 NR protocol TS 38.331 V15.3.0 (2018-09) is indicated through pusch-TransCoherence in MIMO-ParametersPerBand as follows:

| | |
|---|---|
| MIMO-ParametersPerBand ::= | SEQUENCE { |
| ... | |
| pusch-TransCoherence | ENUMERATED {nonCoherent, |
| partialNonCoherent, fullCoherent} | OPTIONAL, |
| ...} | |

If the push-TransCoherence reported by the UE is noncCherent, it can be understood that the UE is a UE with a non-coherent transmission capability; if the push-TransCoherence reported by the UE is partialNonCoherent, it can be understood that the UE is a UE with a partial-coherent transmission capability; and if the push-TransCoherence reported by the UE is fullCoherent, it can be understood that the UE is a UE with a full-coherent transmission capability. The base station may send a codebook subset restriction signaling to the UE based on the antenna coherent transmission capability of the UE, to restrict the UE to use a part of codewords for uplink transmission. The codebook subset restriction signaling indicated by the base station for the UE in the 3GPP R15 NR protocol TS 38.331 V15.3.0 (2018-09) is codebooksubset in PUSCH-Config, as follows:

| | |
|---|---|
| PUSCH-Config ::= | SEQUENCE { |
| .... | |
| codebookSubset | ENUMERATED |
| {fullyAndPartialAndNonCoherent, partialAndNonCoherent, nonCoherent} | |
| ... | |
| } | |

In the LTE and NR systems, a multi-antenna power allocation method for PUSCH using uplink MIMO is that the UE will scale a transmission power (for example, $P_{PUSCH,b,f,c}(i, j, q_d, l)$ in Section 7.1.1 in a Version of TS 38.213 V15.3.0 (2018-09) in the NR system) calculated according to an uplink power control formula, according to a ratio of the number of ports actually transmitting signals in the total number of ports configured by a base station for a transmission mode corresponding to PUSCH, and the scaled power is then equally divided over the antenna ports actually transmitting the signal. For example, assuming that four antenna ports are configured for uplink transmission, the precoding matrix indicated by the base station is $$\frac{1}{2}\begin{bmatrix} 1 \\ 0 \\ 1 \\ 0 \end{bmatrix},$$

since the base station configures four antenna ports for uplink transmission, only two antenna ports in the precoding matrix are non-zero. Therefore, if the transmission power calculated by the UE according to a PUSCH power control formula is P, then the actual transmission power for the PUSCH is P/2, wherein transmission powers of a first antenna port and a third antenna port are respectively P/4. This scaling does not require that each antenna port of the UE can reach the maximum transmission power, allowing the UE to implement a multi-antenna function using cheaper radio frequency elements.

From the perspective of performance of the UE, when the UE is located at a cell edge or a channel condition is poor, the base station generally configures the UE with transmission of a low rank and transmits data at a maximum transmission power as much as possible. Under a codebook design of the NR system, for the codebook-based uplink transmission, the UE with a partial-coherent transmission capability and a non-coherent transmission capability of antennas always has a part of antenna ports not used for PUSCH transmission in case of single rank transmission. Therefore, a current uplink MIMO multi-antenna power allocation mechanism cannot ensure that the UE with the partial-coherent transmission capability and the non-coherent transmission capability of antennas under a codebook-based uplink transmission case can reach the maximum transmission power in case of the single rank transmission, thereby reducing the performance when the UE is at the cell edge and affecting a coverage of the cell.

It can be seen that a transmission power of a UE having a partial-coherent transmission capability and a non-coherent transmission capability in the 3GPP NR system in the related art cannot reach the maximum transmission power of the UE, in case of low rank transmission (or referred to as low stream number transmission) under a codebook-based uplink transmission solution with multiple antenna ports. A 3GPP R15 UE cannot reach an uplink maximum transmission power in case of transmission performed under a condition that the number of ranks of non-codebook uplink multiple antennas is smaller than the number of configured antenna ports. This will reduce the performance of the UE when the UE is at the cell edge, and affects the coverage of the cell. Therefore, in order to solve this problem, a Rel-16 NR system may introduce a new uplink power control scaling rule. There is currently no method for how a UE determines an uplink power control scaling rule in case that there are multiple uplink power control scaling criteria in the system.

SUMMARY

An objective of embodiments of the present disclosure is to provide an uplink power control method and an uplink power control device, which can solve the problem of how to determine an uplink power control scaling rule in case that there are multiple uplink power control scaling criteria in the system.

An embodiment of the present disclosure provides an uplink power control method performed a terminal. The method includes receiving first indication information sent by a base station, wherein the first indication information is used to indicate an uplink power control rule for an uplink signal; determining a transmission power of the uplink signal according to the uplink power control rule indicated by the first indication information.

An embodiment of the present disclosure also provides an uplink power control method performed by a base station. The method includes: sending first indication information to a terminal, wherein the first indication information is used to indicate an uplink power control rule for an uplink signal.

An embodiment of the present disclosure also provide a terminal. The terminal includes a transceiver, a storage, a processor, and a computer program stored on the storage and executable by the processor; the transceiver is configured to receive first indication information sent by a base station, wherein the first indication information is used to indicate an uplink power control rule for an uplink signal; the processor is configured to read the program in the storage and perform following: determining a transmission power of the uplink signal according to the uplink power control rule indicated by the first indication information.

An embodiment of the present disclosure also provides another terminal. The terminal includes: a reception unit, configured to receive first indication information sent by a base station, wherein the first indication information is used to indicate an uplink power control rule for an uplink signal; a determination unit, configured to determine a transmission power of the uplink signal according to the uplink power control rule indicated by the first indication information.

An embodiments of the present disclosure also provides a base station. The base station includes a transceiver, a storage, a processor and a computer program stored on the storage and executable by the processor; the transceiver is configured to send first indication information to a terminal, wherein the first indication information is used to indicate an uplink power control rule for an uplink signal An embodiment of the present disclosure also provides another base station. The base station includes a sending unit, configured to send first indication information to a terminal, wherein the first indication information is used to indicate an uplink power control rule for an uplink signal.

An embodiment of the present disclosure also provides a computer readable storage medium including instructions, wherein when the instructions are executed on a computer, the instructions cause the computer to perform the uplink power control method.

The uplink power control method and the uplink power control device provided by the embodiments of the present disclosure can determine which uplink power control scaling criterion is adopted when there are multiple uplink power control scaling criteria in a system. By exchanging an uplink power control criterion between the base station and the terminal, the base station and the terminal can have the same understanding about uplink power control, thereby ensuring uplink transmission performance.

BRIEF DESCRIPTION OF THE DRAWINGS

In order to more clearly explain technical solutions of the embodiments of the present disclosure, drawings used in description of the embodiments of the present disclosure will be briefly introduced below. It is apparent that drawings described below are only some embodiments of the present disclosure, and those of ordinary skill in the art may obtain other drawings based on the drawings without paying creative labor.

DETAILED DESCRIPTION

Figure 1:
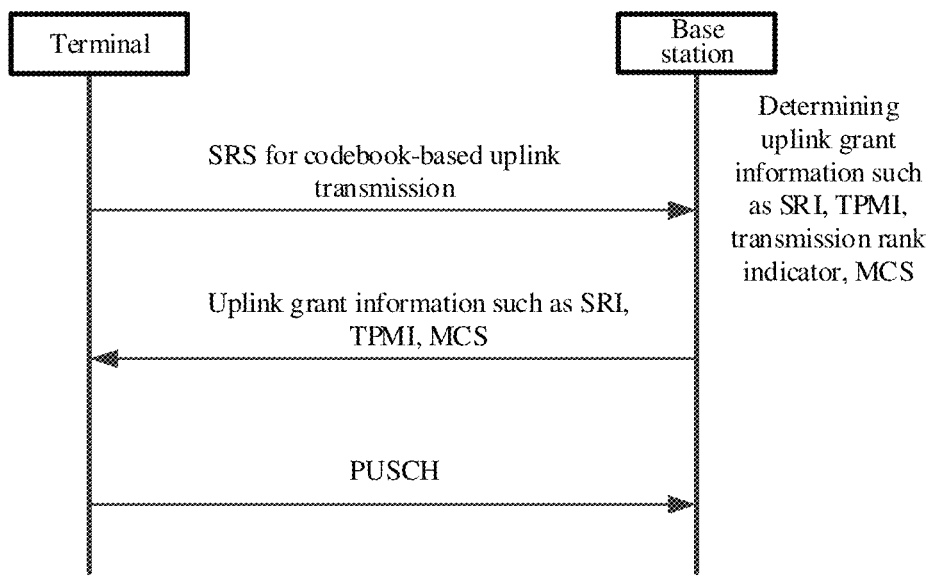
FIG. 1 is a schematic flow chart of a codebook-based uplink transmission solution in the related art.

Exemplary embodiments of the present disclosure will be described in more detail below with reference to the accompanying drawings. Although exemplary embodiments of the present disclosure are shown in the drawings, it should be understood that the present disclosure may be implemented in various forms and should not be limited by the embodiments set forth herein. Rather, these embodiments are provided to enable more thorough understanding of the present disclosure and to convey fully the scope of the present disclosure to those skilled in the art.

Such terms as "first", "second", or the like in the specification and claims of the present application are used to distinguish similar objects and are not necessarily used to describe a particular order or an order of precedence. It should be understood that terms used in such a way may be interchanged where appropriate, so that the embodiments of the present application described herein can be implemented in an order other than those illustrated or described herein. Furthermore, such terms as "include", "have," and any variations thereof, are intended to cover non-exclusive inclusion. For example, a process, a method, a system, a product or a device including a series of steps or units need not be limited to those steps or units that are clearly listed, but may include other steps or elements that are not explicitly listed or inherent to these processes, methods, products or devices. In the specification and the claims, "and/or" means at least one of objects connected by this term.

Techniques described herein are not limited to Long Time Evolution (LTE)/LTE-Advanced (LTE-A) and NR systems, and may also be used in various radio communication systems, such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA) and other systems. Such terms as "system" and "network" are often used interchangeably. A CDMA system may implement radio technologies such as CDMA2000, Universal Terrestrial Radio Access (UTRA), and the like. UTRA includes Wideband Code Division Multiple Access (WCDMA) and other CDMA variants. A TDMA system may implement a radio technology such as Global System for Mobile Communication (GSM). An OFDMA system may implement radio technologies such as Ultra Mobile Broadband (UMB), Evolution-UTRA (E-UTRA), IEEE 802.11 (Wi-Fi), IEEE 802.16 (WiMAX), IEEE 802.20, and Flash-OFDM. UTRA and E-UTRA are part of Universal Mobile Telecommunications System (UMTS). LTE and more advanced LTE, such as LTE-A, are new UMTS versions that use E-UTRA. NR, UTRA, E-UTRA, UMTS, LTE, LTE-A and GSM are described in literature from an organization named 3rd Generation Partnership Project (3GPP). CDMA2000 and UMB are described in literature from an organization named 3rd Generation Partnership Project 2 (3GPP2). The techniques described herein may be used for both the systems and radio technologies mentioned above and for other systems and radio technologies. However, the following description describes the NR system for illustrative purposes, and NR terminology is used in most of the following description, although these techniques are also applicable to applications other than the NR system.

The following description provides examples and does not limit the scope, applicability or configuration set forth in the claims. Changes may be made to functions and arrangements of elements discussed without departing from the spirit and scope of the present disclosure. In various examples, various procedures or components may suitably be omitted, replaced, or added. For example, the described methods may be performed in an order other than that described, and various steps may be added, omitted, or combined. In addition, features described with reference to certain examples may be combined in other examples.

Figure 2:
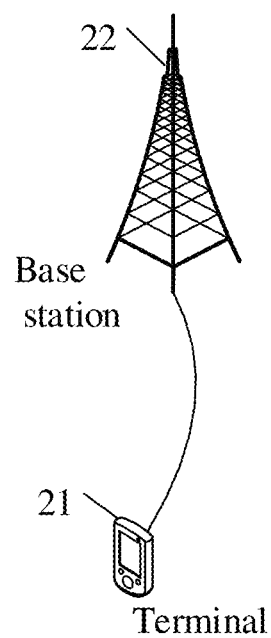
FIG. 2 is a block diagram of a radio communication system to which embodiments of the present disclosure are applicable.

Please referring to FIG. 2, FIG. 2 shows a block diagram of a radio communication system to which embodiments of the present disclosure are applicable. The radio communication system includes a terminal 21 and a base station 22. The terminal 21 may also be referred to as a User Equipment (UE), and the terminal 21 may be a terminal-side device, such as a mobile phone, a Tablet Personal Computer, a Laptop Computer, a Personal Digital Assistant (PDA), a Mobile Internet Device (MID), a Wearable Device or a vehicle-mounted device. It should be noted that, in the embodiments of the present disclosure, ae specific type of the terminal 21 is not limited. The base station 22 may be a 5G and later version base station, such as a gNB, a 5G NR NB, etc., or a base station in other communication systems, such as an eNB, a WLAN access point, or other access points, etc., wherein, a base station may be referred to as a node B, an evolved node B, an access point, a Base Transceiver Station (BTS), a radio base station, a radio transceiver, a Basic Service Set (BSS), an Extended Service Set (ESS), a node B, an evolved node B (eNB), a home node B, a home evolved node B, a WLAN access point, a Wifi node or some other suitable terminology in the field. As long as the same technical effect is achieved, the base station is not limited to a specific technical vocabulary, and it should be noted that in the embodiments of the present disclosure, only the base station in the NR system is taken as an example, but the specific type of the base station is not limited.

The base stations 22 may communicate with the terminal 21 under control of a base station controller. The base station controller may be part of a core network or certain base stations in various examples. Some base stations may communicate control information or user data with a core network through a backhaul. In some examples, some of these base stations may communicate with each other directly or indirectly over a backhaul link which may be a wired or wireless communication link. A radio communication system may support operation on multiple carriers (waveform signals of different frequencies). The multi-carrier transmitter is capable of transmitting modulated signals on a plurality of carriers simultaneously. For example, each communication link may be a multicarrier signal modulated according to various radio technologies. Each modulated signal may be sent on a different carrier and may carry control information (e.g., reference signals, control channels, etc.), overhead information, data, etc.

The base station 22 may communicate wirelessly with the terminal 21 via one or more access point antennas. Each base station may provide communication coverage for a respective coverage area. The coverage area of an access point may be divided into sectors, each of which forms only a portion of the coverage area. A radio communication system may include different types of base stations (e.g., macro base stations, micro base stations, or pico base stations). The base stations may also utilize different radio technologies, such as cellular or WLAN radio access technologies. The base stations may be associated with the same or different access networks or operator deployments. The coverage areas of different base stations (including coverage areas of base stations of the same or different types, coverage areas using the same or different radio technologies, or coverage areas belonging to the same or different access networks) may overlap.

A communication link in a radio communication system may include an uplink for carrying Uplink (UL) transmission, such as from the terminal 21 to the base station 22, or for carrying Downlink (DL) transmission, such as, from the base station 22 to the terminal 21. UL transmission may also be referred to as reverse link transmission, while DL transmission may also be referred to as forward link transmission. The downlink transmission may be performed using a licensed frequency band, an unlicensed frequency band, or both. Similarly, the uplink transmission may be performed using a licensed frequency band, an unlicensed frequency band, or both.

Figure 3:
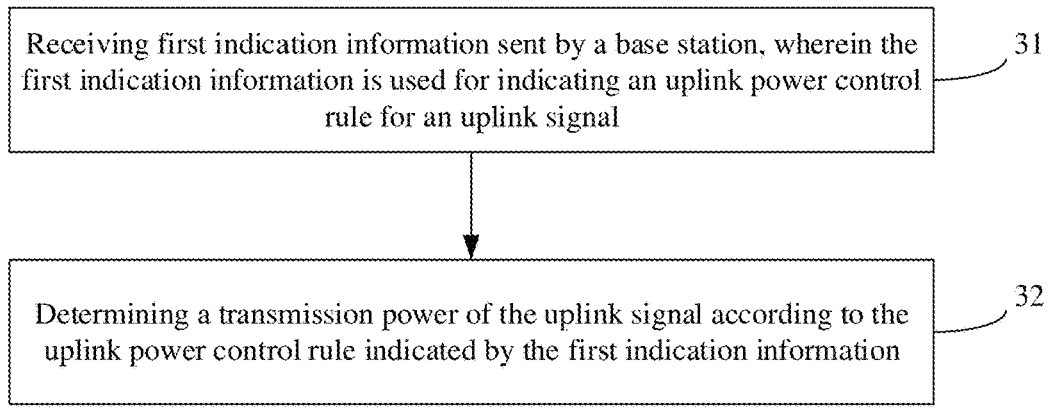
FIG. 3 is a flowchart of an uplink power control method provided by an embodiment of the present disclosure.

In the uplink power control method provided by the embodiments of the present disclosure, the base station and the terminal can communicate about a scaling rule of uplink power control, so that the base station and the terminal can ensure the performance of uplink transmission based on the same understanding about uplink power control. Referring to FIG. 3, the uplink power control method provided by the embodiments of the present disclosure is performed at a terminal side. The method includes steps 31-32.

Step 31: receiving first indication information sent by a base station, wherein the first indication information is used for indicating an uplink power control rule for an uplink signal.

Here, optionally, the uplink signal may be one or more of a PUSCH, a Physical Uplink Control Channel (PUCCH), a SRS, a DeModulation Reference Signal (DMRS) of a PUSCH, a DMRS of PUCCH. Of course, embodiments of the present disclosure are not limited to the above signals. Hereinafter, PUSCH will be mainly taken as an example for explanation. It should be noted that the uplink signal may be a certain type of the above signals or all types of the above signals. For example, the signal is PUSCH in a codebook-based transmission mode.

Optionally, the uplink power control rule is a power scaling rule of the uplink signal.

For example, a power scaling rule for PUSCH is a rule that UE will scale a transmission power (for example, $P_{PUSCH,b,f,c}(i, j, q_d, l)$ in Section 7.1.1 in a Version of TS 38.213 V15.3.0 (2018-09) in the NR system) calculated according to an uplink power control formula.

For example, an uplink power control rule is to scale $P_{PUSCH,b,f,c}(i, j, q_d, l)$ according to a ratio of the number of antenna ports actually transmitting signals, in a precoding matrix in PUSCH (i.e., antenna ports corresponding to non-zero elements in the precoding matrix), in the total number of antenna ports configured by a base station for a transmission mode corresponding to PUSCH, and then the scaled power is equally divided over the antenna ports for actually transmitting signals (this is a rule of the 3GPP NR system R15 or the LTE system).

For another example, an uplink power control rule is to equally divide $P_{PUSCH,b,f,c}(i, j, q_d, l)$ over the antenna ports (that is, the antenna ports corresponding to non-zero elements in the precoding matrix) actually transmitting signals in the precoding matrix of PUSCH.

For another example, an uplink power control rule is to scale $P_{PUSCH,b,f,c}(i, j, q_d, l)$ according to a scaling factor of a precoding matrix corresponding to PUSCH; transmission powers of antenna ports are the scaled powers. For example, if the precoding matrix of PUSCH is $$\frac{1}{\sqrt{2}}\begin{bmatrix}1\\j\end{bmatrix},$$

then $P_{PUSCH,b,f,c}(i, j, q_d, l)$ is scaled to the square of the scaling factor $$\frac{1}{\sqrt{2}}$$

of the precoding matrix, the transmission powers of two antenna ports with non-zero elements corresponding to the precoding matrix are the scaled powers.

Step 32: determining a transmission power of the uplink signal according to the uplink power control rule indicated by the first indication information.

Optionally, the terminal determines the transmission power of the uplink signal according to the uplink power control rule indicated by the first indication information, when the uplink signal needs to be transmitted.

The terminal transmits the uplink signal using the transmission power after the transmission power of the uplink signal is determined.

For example, the first indication information indicates the uplink power control rule for PUSCH in the codebook-based transmission mode. After a period of time elapses after the terminal receives the first indication information, the base station instructs the terminal to send PUSCH, and the transmission mode is a codebook-based uplink transmission mode. The terminal determines the transmission power of PUSCH by using the first indication information, after the terminal receives the instruction for transmitting PUSCH and before the terminal transmits PUSCH, and the terminal transmits the PUSCH.

Optionally, the first indication information may indicate an uplink power control rule for the uplink signal in different transmission modes. For example, the first indication information indicates an uplink power control rule for PUSCH in a codebook-based uplink transmission mode and an uplink power control rule for PUSCH in a non-codebook-based uplink transmission mode, the two uplink power control rules may be the same or different. When the terminal is to transmit the PUSCH in the codebook-based uplink transmission mode, the terminal determines the transmission power of PUSCH by using the uplink power control rule for the PUSCH in the codebook-based uplink transmission mode indicated by the first indication information; and when the terminal is to transmit the PUSCH in the non-codebook-based uplink transmission mode, the terminal determines the transmission power of the PUSCH by using the uplink power control rule for the PUSCH in the non-codebook-based uplink transmission mode indicated by the first indication information.

Optionally, the first indication information indicates uplink power control rules of a plurality of uplink signals. For example, the first indication information indicates the uplink power control rule for PUSCH and an uplink power control rule for SRS in the codebook-based uplink transmission mode. When the terminal is to transmit the PUSCH in the codebook-based uplink transmission mode, the terminal determines the transmission power of the PUSCH by using the uplink power control rule for the PUSCH in the codebook-based uplink transmission mode indicated by the first indication information; and when the terminal is to transmit the SRS, the terminal determines the transmission power of the SRS using the uplink power control rule for the SRS indicated by the first indication information.

Here, after the terminal receives the first indication information, the terminal may determine the uplink power control rule indicated by the first indication information, and then determine the transmission power of the uplink signal according to the uplink power control rule. After the terminal determines the transmission power of the uplink signal, the terminal transmits the uplink signal using the determined transmission power.

Through the above steps, the embodiments of the present disclosure can realize the same understanding of uplink power control between the base station and the terminal, thereby ensuring the performance of uplink transmission.

Optionally, the first indication information according to the embodiment of the present disclosure may also indicate a precoder and/or the number of layers of the uplink signal. After the terminal receives the first indication information, the terminal may simultaneously obtain the power control rule of the uplink signal and the precoder and/or the number of layers.

Further, in the embodiment of the present disclosure, before the terminal receives the first indication information, the terminal may also report an uplink power control rule supported by the terminal and/or a power amplifier (PA) capability of the terminal to the base station, so that the base station determines the uplink power control rule for the uplink signal of the terminal.

For example, if uplink power control rules supported by the terminal and reported by the terminal are {Rule 1, Rule 2}, the base station may indicate Rule 1 or Rule 2 for the terminal through the first indication information, but cannot indicate Rule 3 for the terminal. In another example, a PA capability report by the terminal is that only one PA of multiple PAs of the terminal can reach the maximum transmission power, the first indication information cannot indicate, to the terminal, a rule that requires all of the PAs of the terminal to reach the maximum transmission power. Optionally, the maximum transmission power in this example is a maximum output power corresponding to a power class of the UE.

Optionally, if one uplink power control rule specifies that a transmission power of a single antenna port (or a single PA) determined by the terminal according to the uplink power control rule is capable of reaching the maximum power (for example, the uplink signal is PUSCH, the maximum power is $P_{CMAX,f,c}(i)$ in Section 7.1.1 in a version of 3GPP TS 38.213 V15.3.0 (2018-09)), and the uplink power control rule is considered to be a rule requiring that a single PA of the terminal can reach the maximum transmission power.

Optionally, if one uplink power control rule specifies that a transmission power of a single antenna port (or a single PA) determined by the terminal according to the uplink power control rule is capable of reaching the maximum power (for example, the uplink signal is PUSCH, the maximum power is $P_{CMAX,f,c}(i)$ in Section 7.1.1 of a version of 3GPP TS 38.213 V15.3.0 (2018-09)), and the uplink power control rule is considered to be a rule requiring that all PAs of the terminal can reach the maximum transmission power.

Optionally, the PA capability of the terminal is reported by indicating whether a PA of the terminal can reach the maximum transmission power.

Optionally, there is a correspondence relationship between the PA capability of the terminal and the uplink power control rule. For example, one PA capability may correspond to a set of uplink power control rules, and another PA capability may correspond to another set of uplink power control rules.

Optionally, the terminal reports the PA capability of the terminal by indicating the maximum power achievable by an antenna port.

In an embodiment of the present disclosure, the first indication information may be indicated by at least one of a Radio Resource Control (RRC) signaling, a Medium Access Control-Control Element (MAC-CE) signaling, and Downlink Control Information (DCI). Implementation modes of the first indication information of the embodiment of the present disclosure are illustrated below.

Implementation Mode 1

The first indication information includes or is a dedicated signaling for indicating an uplink power control rule for an uplink signal, wherein the dedicated signaling includes at least two states, wherein, a first state of the dedicated signaling is used to indicate a first uplink power control rule, and a second state of the dedicated signaling is used to indicate a second uplink power control rule, the first uplink power control rule is different from the second uplink power control rule.

In the above step 32, the terminal may determine the transmission power of the uplink signal using the first uplink power control rule, in a case that the dedicated signaling is in the first state, and determine the transmission power of the uplink signal using the second uplink power control rule, in a case that the dedicated signaling is in the second state.

For example, the uplink signal is PUSCH in a codebook-based transmission mode, and the first indication information includes or is an RRC signaling for indicating an uplink power control rule for the uplink signal. A value of the first indication information can be {Value 1, Value 2, Value 3}, wherein Value 1 indicates a first state, a corresponding first uplink power control rule is to scale $P_{PUSCH,b,f,c}(i, j, q_d, l)$ according to a ratio of the number of antenna ports actually transmitting signals, in a precoding matrix (i.e. antenna ports corresponding to non-zero elements in the precoding matrix) of PUSCH, in the total number of antenna ports configured by a base station for a transmission mode corresponding to PUSCH, and the scaled power is then equally divided over the antenna ports actually transmitting the signal (this is a rule in a 3GPP NR R15 system or a LTE system); Value 2 indicates a second state, a corresponding second uplink power control rule is to equally divide $P_{PUSCH,b,f,c}(i, j, q_d, l)$ over antenna ports actually transmitting signals, in a precoding matrix of PUSCH (i.e. antenna ports corresponding to non-zero elements in the precoding matrix); Value 3 indicates a third state, and a corresponding third uplink power control rule is to determine the uplink power according to the number of coherent antenna groups included in the precoder of the uplink signal.

Optionally, the dedicated signaling may be 1-bit signaling. For example, when a value of the signaling is 0, it means the first uplink power control rule, and when the value of the signaling is 1, it means the second uplink power control rule.

Implementation Mode 2

The first indication information is a state of an indication field or an indication parameter used for indicating a precoder and the number of layers of the uplink signal, and the first indication information is not used for indicating the precoder of the uplink signal. Optionally, the first indication information is used to indicate the number of layers of the uplink signal.

In the above step 32, the terminal may determine a transmission power of the uplink signal according to the uplink power control rule corresponding to a current state of the indication field or indication parameter used for indicating the precoder and the number of layers of the uplink signal.

Implementation Mode 3

The first indication information includes or is precoder indication information of the uplink signal. For example, in a case that the uplink signal is PUSCH in the codebook-based transmission mode, or PUSCH in a non-codebook-based transmission mode, or type 2 configured grant PUSCH, the first indication information includes or is a precoder and transmission rank indicator in DCI. The precoder indication information includes at least two precoder states, and the first state is used for indicating a first uplink power control rule and a first precoder, the second state is used to indicate a second uplink power control rule and a second precoder, and it can be seen that a first precoder state corresponds to the first uplink power control rule, a second precoder state corresponds to the second uplink power control rule. It should be noted that the precoder indication information may further include more precoder states, such as third and fourth precoder states. In a case that the precoder indication information corresponds to the third state, the third state corresponds to a third uplink power control rule, and the like. The embodiments of the present disclosure are not particularly limited by the above states.

In the above step 32, the terminal may determine the transmission power of the uplink signal according to the first uplink power control rule if the precoder indication information indicates the first state, and, determine the transmission power of the uplink signal according to the second uplink power control rule if the precoder indication information indicates the second state.

Optionally, precoders indicated by the first precoder state and the second precoder state may be the same precoder, but the first uplink power control rule is different from the second uplink power control rule. That is, the precoder indication information includes different pieces of state information indicating the same precoder (TPMI), and the different pieces of state information correspond to different uplink power control rules. Of course, the precoders indicated by the first precoder state and the second precoder state may be different precoders, and the first uplink power control rule is different from the second uplink power control rule.

An example of this implementation mode is shown in Table 1 below. Table 1 shows attributes corresponding to the precoder indication information (for example, the precoder and transmission rank indicator in DCI) in different precoder states. In Table 1, "Bit field mapped to index" represents an index of a precoder state, "codebookSubset" represents a codebook subset, indicated by the base station, of PUSCH in the codebook-based transmission mode, "nonCoherent" represents non-coherent transmission, and "fullyAndPartialAndNonCoherent" represents fully-coherent transmission. When codebokSubset=nonCoherent, if "Bit field mapped to index" corresponding to the "precoder and transmission rank indicator" is 0, 1, which corresponds to the first precoder state in single stream transmission; "Bit field mapped to index" is 3, 4, which corresponds to the second precoder state in single stream transmission. When the "Bit field mapped to index" corresponding to the precoder and transmission rank indicator is 0, it means that the precoder corresponding to TPMI=0 is adopted, and the transmission power of the uplink signal is determined according to the first uplink power control rule (for example, the uplink signal is transmitted, according to the transmission power obtained after scaling is performed according to an uplink power scaling rule); when the "Bit field mapped to index" is 3, it indicates that the precoder corresponding to TPMI=0 is adopted (the same as the precoder when the "Bit field mapped to index" is 0), and the transmission power of the uplink signal is determined according to the second uplink power control rule (for example, the transmission power is not scaled).

TABLE 1

| Bit field mapped to index | codebookSubset = fullyAndPartialAndNonCoherent | Bit field mapped to index | codebookSubset = nonCoherent |
| --- | --- | --- | --- |
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | 1 layer: TPMI = 0 |
| 4 | 1 layer: TPMI = 3 | 4 | 1 layer: TPMI = 1 |
| 5 | 1 layer: TPMI = 4 | 5-7 | Reserved |
| 6 | 1 layer: TPMI = 5 | | |

TABLE 1-continued

| Bit field mapped to index | codebookSubset = fullyAndPartialAndNonCoherent | Bit field mapped to index | codebookSubset = nonCoherent |
|---|---|---|---|
| 7 | 2 layers: TPMI = 1 | | |
| 8 | 2 layers: TPMI = 2 | | |
| 9-15 | reserved | | |

Implementation Mode 4

The first indication information includes or is precoder indication information of an uplink signal, wherein when the precoder indicated by the first indication information satisfies a first preset condition, the first indication information indicates a first uplink power control rule; and when the precoder indicated by the first indication information satisfies a second preset condition, the first indication information indicates a second uplink power control rule, the first preset condition and the second preset condition are different, and the first uplink power control rule is different from the second uplink power control rule.

In the above step 32, the terminal may determine the transmission power of the uplink signal according to the first uplink power control rule when the precoder indicated by the first indication information satisfies the first preset condition, and, determine the transmission power of the uplink signal according to the second uplink power control rule when the precoder indicated by the first indication information satisfies the second preset condition.

Optionally, the first preset condition is that a sum of squares of magnitudes of elements in the precoding matrix is 1, and the second preset condition is that a sum of squares of magnitudes of elements in the precoding matrix is not equal to 1. Here, an element in the precoding matrix is understood to be an element multiplied by a scaling coefficient (or referred to as a scaling factor) in front of the precoding matrix. For example, assuming that the precoding matrix is $$\frac{1}{\sqrt{2}}\begin{bmatrix}1\\j\end{bmatrix},$$

the elements of the matrix are $1/\sqrt{2}$ and $j/\sqrt{2}$. Since the sum of the square of magnitudes of the two elements is 1, the precoder meets the first preset condition. As another example, assuming that the precoding matrix is $$\frac{1}{2}\begin{bmatrix}1\\j\end{bmatrix},$$

the elements of the matrix are $1/2$ and $j/2$, and the sum of the square of the magnitudes of the two elements is $1/4$, thus, the precoder meets the second preset condition.

Implementation Mode 5

A codebook of the uplink signal includes at least two codewords, positions of non-zero elements in the at least two codewords are the same, relative phase relationships between the non-zero elements are the same, and scaling factors for the non-zero elements are different. Here, a scaling factor refers to a coefficient in front of a matrix of a codeword. The first indication information includes or is precoder indication information of an uplink signal, wherein when the precoder indication information corresponds to different codewords of the at least two codewords, the precoder indication information indicates different uplink power control rules, and the different uplink power control rules include at least a first uplink power control rule and a second uplink power control rule.

In the above step 32, the terminal may determine the transmission power of the uplink signal according to the first uplink power control rule when the first indication information indicates a first codeword of the at least two codewords, and, determine the transmission power of the uplink signal according to the second uplink power control rule when the first indication information indicates a second codeword of the at least two codewords, wherein the first uplink power control rule is different from the second uplink power control rule.

For example, the first codeword of two precoded codewords is $$\frac{1}{\sqrt{2}}\begin{bmatrix}1\\j\end{bmatrix},$$

the second codeword of the two precoded codewords is $$\frac{1}{2}\begin{bmatrix}1\\j\end{bmatrix},$$

the scaling factor of the non-zero element of the first codeword is $$\frac{1}{\sqrt{2}},$$

and the scaling factor of the non-zero element of the second codeword is $1/2$. When the precoder indication information corresponds to the first codeword, the precoder indication information indicates the first uplink power control rule, and when the precoder indication information corresponds to the second codeword, the precoder indication information indicates the second uplink power control rule, where the first uplink power control rule may be different from the second uplink power control rule.

It should be noted that this implementation mode is also applicable to a case where the codebook also contains more codewords, such as a third codeword, the codewords (such as the third codeword, the first codeword and the second codeword) all include non-zero elements at the same position, and the relative phase relationships between the non-zero elements are the same, and the scaling factors are different.

An exemplary two-antenna single-stream codebook of PUSCH is shown in Table 2, where TPMI index=1 corresponds to the first codeword, and TPMI index=7 corresponds to the second codeword. When the TPMI indicated by the base station corresponds to TPMI index=1, a total transmission power of the uplink signal is 1/2 of the transmission power calculated according to the uplink power control calculation formula; and when the TPMI indicated by the base station corresponds to TPMI index=7, the total transmission power of the uplink signal is the transmission power calculated according to the uplink power control calculation formula.

Implementation Mode 6

The first indication information further indicates codebook subset restriction of the uplink signal.

Optionally, the first indication information includes or is indication information of codebook subset restriction of the uplink signal, and there is a correspondence relationship between information of codebook subset restriction and the uplink power control rule. Optionally, in the correspondence relationship, a value of codebook subset restriction information corresponds to one uplink power control rule, and one uplink power control rule corresponds to at least one value of codebook subset restriction information.

In the above step 32, the terminal may determine the transmission power of the uplink signal according to an uplink power control rule corresponding to codebook subset restriction indication information of the uplink signal.

In this implementation mode, the first indication information includes or is codebook subset restriction indication information of the uplink signal (for example, the first indication information is an RRC signaling codebooksubset), wherein the uplink power control rule indicated by the codebook subset restriction indication information is an uplink power control rule corresponding to the codebook subset restriction indication information.

For example, candidate values of the codebook subset restriction indication information include at least a first candidate value and a second candidate value, and different candidate values correspond to different groups of codebook subsets. When the codebook subset restriction indication information corresponds to the first candidate value, the codebook subset restriction indication information corresponds to the first uplink power control rule. When the codebook subset restriction indication information corresponds to the second candidate value, the codebook subset restriction indication information corresponds to the second uplink power control rule. It should be noted that, the candidate values of the codebook subset restriction indication information may further include more values, such as a third candidate value, which respectively correspond to more uplink power control rules.

For example, the codebook subset restriction information of the uplink signal that may be indicated by the base station for the terminal is {Codebook subset restriction 1, Codebook subset restriction 2, Codebook subset restriction 3, Codebook subset restriction 4}; when the codebook subset restriction indication information indicates "Codebook subset restriction 1" or "Codebook subset restriction 2", the codebook subset restriction indication information corresponds to an uplink power control rule; when the codebook subset restriction indication information indicates "Codebook subset restriction 3" or "Codebook subset restriction 4", the codebook subset restriction indication information corresponds to another uplink power control rule.

Implementation Mode 7

The first indication information includes at least two states, wherein the at least two states respectively correspond to different uplink power control rules. First indication information of codebook subset restriction indicated by the base station may respectively correspond to different codebook subsets when the first indication information is in different states.

In the above step 32, the terminal may receive the codebook subset restriction indication information sent by the base station, the codebook subset restriction indication information indicates a first codebook subset restriction state, the terminal determines that the first codebook subset restriction state corresponds to first codebook subset restriction when the first indication information indicates the first state, and, determines that the first codebook subset restriction state corresponds to second codebook subset restriction when the first indication information indicates the second state, wherein the first codebook subset restriction is different from the second codebook subset restriction.

For example, the first indication information includes at least a first state and a second state, and the first state and the second state correspond to different uplink power control rules. When the first indication information is in the first state, first codebooksubset indicated by the base station corresponds to a first codebook subset; and when the first indication information is in the second state, the first codebooksubset indicated by the base station corresponds to a second codebook subset, the first codebook subset and the second codebook subset are different. Of course, some pieces of codebook subset restriction information may have the same codebook subset in the first state and the second state of the first indication information, which is not particularly limited in the embodiment of the present disclosure.

Taking the codebook of Table 2 as an example, it is assumed that the first state of the first indication information corresponds to an uplink power control rule 1, and the second state of the first indication information corresponds to an uplink power control rule 2. Assuming that codebook subset restriction codebooksubset indicated by the base station to the terminal is nonCoherent, and if the first indication information is in the first state, a codebook corresponding to the first codebook subset restriction is codewords for TPMI index=0, 1; and if the first indication information is in the second state, a codebook corresponding to the first codebook subset restriction is codewords for TPMI index=6, 7. The terminal determines, according to the uplink power control rule indicated by the first indication information, a precoder indicated by the precoder indication information transmitted for the uplink signal by the base station. Assuming that the "Bit field mapped to index" of the TPMI received by the terminal is 0, then if the first indication information is in the first state, the terminal considers that the precoding matrix is $$\frac{1}{\sqrt{2}}\begin{bmatrix}1\\0\end{bmatrix},$$

the uplink power control rule is a first uplink power control rule, and if the first indication information is in the second state, the terminal considers that the precoding matrix is $$\begin{bmatrix}1\\0\end{bmatrix},$$

and the uplink power control rule is a second uplink power control rule.

TABLE 2

| TPMI index | w (TPMI indexes are numbered in an ascending order from left to right) | | | | | | |
|---|---|---|---|---|---|---|---|
| 0-7 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ $\begin{bmatrix}1\\0\end{bmatrix}$ $\begin{bmatrix}0\\1\end{bmatrix}$ | | | | | | |

Implementation Mode 8

The first indication information includes or is precoder indication information of an uplink signal (for example, a precoder and transmission rank indicator in DCI), wherein, the uplink power control rule indicated by the precoder indication information is an uplink power control rule corresponding to a codeword group indicated by the precoder indication information. Optionally, each codeword group includes at least one codeword, and there is no overlapping codeword between different codeword groups.

For example, the codebook of the uplink signal includes at least a first codeword group and a second codeword group, and there is no overlapping codeword between different codeword groups. When the precoder indication information corresponds to the first codeword group, the precoder indication information corresponds to the first uplink power control rule; and when the precoder indication information corresponds to the second codeword group, the precoder indication information corresponds to the second uplink power control rule. It should be noted that this implementation mode is also applicable to the case where the codebook also includes a third codeword group or more codeword groups, for example, when the precoder indication information corresponds to the third codeword group, the precoder indication information may correspond to a third type of uplink power control rule, etc.

An exemplary two-antenna single-stream codebook of PUSCH is shown in Table 2 above, where TPMI indexes=0-5 correspond to the first codeword group, and TPMI indexes=6-7 correspond to the second codeword group. When a TPMI indicated by the base station is a codeword in the first codeword group, the total transmission power of the uplink signal is 1/2 of the transmission power calculated according to the uplink power control calculation formula; and when the TPMI indicated by the base station is a codeword in the second codeword group, the total transmission power of the uplink signal is the transmission power calculated according to the uplink power control calculation formula.

Implementation Mode 9

The first indication information includes at least two candidate values, wherein the at least two candidate values respectively correspond to different uplink power control rules; the first codebook subset restriction indication information indicated by the base station respectively correspond to different codebook subsets in case of different candidate values of the first indication information.

An example of this implementation mode is as follows.

When the first indication information is the first candidate value and the codebooksubset indicated by the base station is non-coherent, corresponding codebook subsets are TPMIs 0-1 in the following Table 3; and when the first indication information is the second candidate value and the codebook-subset indicated by the base station is non-coherent, corresponding codebook subsets are TPMIs 0-2 in the following table.

FIG. 3

| TPMI index | w (TPMI indexes are numbered in an ascending order from left to right) | | | | | | |
|---|---|---|---|---|---|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — | | | | | | |

In the embodiment of the present disclosure, candidate uplink power control rules may include at least a first uplink power control rule and a second uplink power control rule. For example, the first uplink power control rule may be a predefined third uplink power control rule (e.g., an uplink power control rule defined by 3GPP R15); the second uplink power control rule may be a predefined fourth uplink power control rule (e.g., an uplink power control rule defined by 3GPP R16). As another example, the first uplink power control rule may be a predefined uplink power control rule (e.g., an uplink power control rule defined by 3GPP R15), the second uplink power control rule may be an uplink power control rule reported by the terminal or an uplink power control rule corresponding to a Power Amplifier (PA) capability reported by the terminal.

Figure 4:
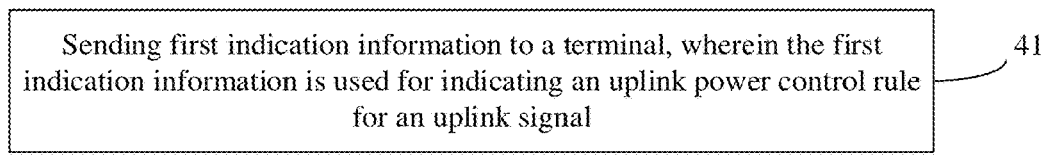
FIG. 4 is another flowchart of an uplink power control method provided by an embodiment of the present disclosure.

Referring to FIG. 4, an uplink power control method is provided by an embodiment of the present disclosure. The method is applied to a base station side. The method includes a Step 41.

Step 41: sending first indication information to a terminal, wherein the first indication information is used for indicating an uplink power control rule for an uplink signal.

Here, optionally, the uplink signal may be one or more of a PUSCH, a PUCCH, a SRS, a DMRS of a PUSCH, a DMRS of PUCCH. Of course, embodiments of the present disclosure are not limited to the above signals. It should be noted that the uplink signal may be a certain type of the above signals or all types of the above signals. For example, the signal is PUSCH in a codebook-based transmission mode.

Optionally, the first indication information may indicate an uplink power control rule for the uplink signal in different transmission modes. For example, the first indication information indicates an uplink power control rule for PUSCH in a codebook-based uplink transmission mode and an uplink power control rule for PUSCH in a non-codebook-based uplink transmission mode, the two uplink power control rules may be the same or different.

Optionally, the first indication information indicates uplink power control rules of a plurality of uplink signals. For example, the first indication information indicates the uplink power control rule for PUSCH and an uplink power control rule for SRS in the codebook-based uplink transmission mode.

Optionally, the uplink power control rule is a power scaling rule of the uplink signal. For example, a power scaling rule for PUSCH is a rule that UE will scale a transmission power (for example, $P_{PUSCH,b,f,c}(i, j, q_d, l)$ in Section 7.1.1 in a version of TS 38.213 V15.3.0 (2018-09) in the NR system) calculated according to an uplink power control formula. For example, an uplink power control rule is to scale $P_{PUSCH,b,f,c}(i, j, q_d, l)$ according to a ratio of the number of antenna ports actually transmitting signals, in a precoding matrix in PUSCH (i.e., antenna ports corresponding to non-zero elements in the precoding matrix), in the total number of antenna ports configured by a base station for a transmission mode corresponding to PUSCH, and then the scaled power is equally divided over the antenna ports for actually transmitting signals (this is a rule of the 3GPP NR system R15 or the LTE system). For another example, an uplink power control rule is to equally divide $P_{PUSCH,b,f,c}(i, j, q_d, l)$ over the antenna ports (that is, the antenna ports corresponding to non-zero elements in the precoding matrix) actually transmitting signals in the precoding matrix of PUSCH. For another example, an uplink power control rule is to scale $P_{PUSCH,b,f,c}(i, j, q_d, l)$ according to a scaling factor of a precoding matrix corresponding to PUSCH; transmission powers of antenna ports are the scaled powers. For example, if the precoding matrix of PUSCH is $$\frac{1}{\sqrt{2}}\begin{bmatrix}1\\0\end{bmatrix},$$

then $P_{PUSCH,b,f,c}(i, j, q_d, l)$ is scaled to the square of the scaling factor $$\frac{1}{\sqrt{2}}$$

of the precoding matrix, the transmission power of the antenna port with a non-zero element corresponding to the precoding matrix is the scaled power.

Optionally, candidate uplink power control rules may include at least a first uplink power control rule and a second uplink power control rule. For example, the first uplink power control rule may be an uplink power control rule defined by 3GPP R15. The second uplink power control rule may be an uplink power control rule defined by 3GPP R16. As another example, the first uplink power control rule may be an uplink power control rule defined by 3GPP R15, the second uplink power control rule may be an uplink power control rule reported by the terminal or an uplink power control rule corresponding to a Power Amplifier (PA) capability reported by the terminal. Specifically, the uplink power control rule is a power scaling rule of an uplink signal.

Through the above steps, the base station realizes an indication of the uplink power control rule for the uplink signal of the terminal, and the same understanding of the uplink power control can be realized between the base station and the terminal, thereby ensuring the performance of uplink transmission. Prior to step 41 described above, the base station may also receive an uplink power control rule supported by the terminal and/or a Power Amplifier (PA) capability of the terminal reported by the terminal; and further determines an uplink power control rule for the uplink signal according to the uplink power control rule supported by the terminal and/or a power amplifier PA capability of the terminal. Thus, an appropriate uplink power control rule (i.e., first indication information) can be determined for the terminal at the base station side, for example, when the uplink power control rule supported by the terminal and/or the power amplifier PA capability of the terminal are different, ranges of values of the determined uplink power control rules of the uplink signal are different.

Optionally, in the embodiment of the present disclosure, the first indication information determined by the base station may indicate a range of a value of the uplink power control rule, the range of the value should comply with the uplink power control rule supported by the terminal and/or the power amplifier (PA) capability of the terminal, that is, not exceed the uplink power control rule supported by the terminal and/or the power amplifier (PA) capability of the terminal.

For example, if uplink power control rules supported by the terminal and reported by the terminal are {Rule 1, Rule 2}, the base station may indicate Rule 1 or Rule 2 for the terminal through the first indication information, but cannot indicate Rule 3 for the terminal. In another example, a PA capability report by the terminal is that only one PA of multiple PAs of the terminal can reach the maximum transmission power, the first indication information cannot indicate, to the terminal, a rule that requires all of the PAs of the terminal to reach the maximum transmission power. Optionally, the maximum transmission power in this example is a maximum output power corresponding to a power class of the UE. Optionally, if one uplink power control rule specifies that a transmission power of a single antenna port (or a single PA) determined by the terminal according to the uplink power control rule is capable of reaching the maximum power (for example, the uplink signal is PUSCH, the maximum power is $P_{CMAX,f,c}(i)$ in Section 7.1.1 in a version of 3GPP TS 38.213 V15.3.0 (2018-09)), and the uplink power control rule is considered to be a rule requiring that a single PA of the terminal can reach the maximum transmission power. Optionally, if one uplink power control rule specifies that a transmission power of any single antenna port (or a single PA) determined by the terminal according to the uplink power control rule is capable of reaching the maximum power (for example, the uplink signal is PUSCH, the maximum power is $P_{CMAX,f,c}(i)$ in Section 7.1.1 of a version of 3GPP TS 38.213 V15.3.0 (2018-09)), and the uplink power control rule is considered to be a rule requiring that all PAs of the terminal can reach the maximum transmission power.

Optionally, the PA capability of the terminal is reported by indicating whether a PA of the terminal can reach the maximum transmission power.

Optionally, there is a correspondence relationship between the PA capability of the terminal and the uplink power control rule. For example, one PA capability may correspond to a set of uplink power control rules, and another PA capability may correspond to another set of uplink power control rules. If the first indication information indicates an uplink power control rule in an uplink power control rule group corresponding to the PA capability, then it is considered that the uplink power control rule indicated by the first indication information complies with the uplink power control rule supported by the terminal and/or the power amplifier PA capability of the terminal, that is, does not exceed the uplink power control rules supported by the terminal and/or the power amplifier (PA) capability of the terminal Optionally, the terminal reports the PA capability of the terminal by indicating the maximum power achievable by an antenna port.

Furthermore, the base station may determine uplink scheduling information of the uplink signal according to the uplink power control rule for the uplink signal indicated by the first indication information. Here, the uplink scheduling information includes, but is not limited to, at least one of following: precoder indication information (TPMI), transmission layer number indication (Rank Indicator, RI), an SRS resource indicator (SRI), a Modulation and Coding Scheme (MCS), and the like.

In an embodiment of the present disclosure, the first indication information may be indicated by at least one of a Radio Resource Control (RRC) signaling, a Medium Access Control-Control Element (MAC-CE) signaling, and Downlink Control Information (DCI). Implementation modes of the first indication information of the embodiment of the present disclosure are illustrated below Corresponding to the respective implementation modes at the terminal side, there are the following implementation modes.

Implementation Mode 1

The first indication information includes or is a dedicated signaling for indicating an uplink power control rule for an uplink signal, wherein the dedicated signaling includes at least two states, wherein, a first state of the dedicated signaling is used to indicate a first uplink power control rule, and a second state of the dedicated signaling is used to indicate a second uplink power control rule, the first uplink power control rule is different from the second uplink power control rule.

For example, the uplink signal is PUSCH in a codebook-based transmission mode, and the first indication information includes or is an RRC signaling for indicating an uplink power control rule for the uplink signal. A value of the first indication information can be {Value 1, Value 2, Value 3}, wherein Value 1 indicates a first state, a corresponding first uplink power control rule is to scale $P_{PUSCH,b,f,c}(i, j, q_d, l)$ according to a ratio of the number of antenna ports actually transmitting signals, in a precoding matrix (i.e. antenna ports corresponding to non-zero elements in the precoding matrix) of PUSCH, in the total number of antenna ports configured by a base station for a transmission mode corresponding to PUSCH, and the scaled power is then equally divided over the antenna ports actually transmitting the signal (this is a rule in a 3GPP NR R15 system or a LTE system); Value 2 indicates a second state, a corresponding second uplink power control rule is to equally divide $P_{PUSCH,b,f,c}(i, j, q_d, l)$ over antenna ports actually transmitting signals, in a precoding matrix of PUSCH (i.e. antenna ports corresponding to non-zero elements in the precoding matrix); Value 3 indicates a third state, and a corresponding third uplink power control rule is to determine the uplink power according to the number of coherent antenna groups included in the precoder of the uplink signal.

Optionally, the dedicated signaling may be 1-bit signaling. For example, when a value of the signaling is 0, it means the first uplink power control rule, and when the value of the signaling is 1, it means the second uplink power control rule.

Implementation Mode 2

The first indication information is a state of an indication field or an indication parameter used for indicating a precoder and the number of layers of the uplink signal, and the first indication information is not used for indicating the precoder of the uplink signal. Optionally, the first indication information is used to indicate the number of layers of the uplink signal.

Implementation Mode 3

The first indication information includes or is precoder indication information of the uplink signal. For example, in a case that the uplink signal is PUSCH in the codebook-based transmission mode, or PUSCH in a non-codebook-based transmission mode, or type 2 configured grant PUSCH, the first indication information includes or is a precoder and transmission rank indicator in DCI. The precoder indication information includes at least two precoder states, and the first state is used for indicating a first uplink power control rule and a first precoder, the second state is used to indicate a second uplink power control rule and a second precoder, and it can be seen that a first precoder state corresponds to the first uplink power control rule, a second precoder state corresponds to the second uplink power control rule. It should be noted that the precoder indication information may further include more precoder states, such as third and fourth precoder states. In a case that the precoder indication information corresponds to the third state, the third state corresponds to a third uplink power control rule, and the like. The embodiments of the present disclosure are not particularly limited by the above states.

Optionally, precoders indicated by the first precoder state and the second precoder state may be the same precoder, but the first uplink power control rule is different from the second uplink power control rule. That is, the precoder indication information includes different pieces of state information indicating the same precoder (TPMI), and the different pieces of state information correspond to different uplink power control rules. Of course, the precoders indicated by the first precoder state and the second precoder state may be different precoders, and the first uplink power control rule is different from the second uplink power control rule.

An example of this implementation mode is shown in Table 1 above. Table 1 shows attributes corresponding to the precoder indication information (for example, the precoder and transmission rank indicator in DCI) in different precoder states. In Table 1, "Bit field mapped to index" represents an index of a precoder state, "codebookSubset" represents a codebook subset, indicated by the base station, of PUSCH in the codebook-based transmission mode, "nonCoherent" represents non-coherent transmission, and "fullyAndPartialAndNonCoherent" represents fully-coherent transmission. When codebokSubset=nonCoherent, if "Bit field mapped to index" corresponding to the "precoder and transmission rank indicator" is 0, 1, which corresponds to the first precoder state in single stream transmission; "Bit field mapped to index" is 3, 4, which corresponds to the second precoder state in single stream transmission. When the "Bit field mapped to index" corresponding to the precoder and transmission rank indicator is 0, it means that the precoder corresponding to TPMI=0 is adopted, and the transmission power of the uplink signal is determined according to the first uplink power control rule (for example, the uplink signal is transmitted, according to the transmission power obtained after scaling is performed according to an uplink power scaling rule); when the "Bit field mapped to index" is 3, it indicates that the precoder corresponding to TPMI=0 is adopted (the same as the precoder when the "Bit field mapped to index" is 0), and the transmission power of the uplink signal is determined according to the second uplink power control rule (for example, the transmission power is not scaled).

Implementation Mode 4

The first indication information includes or is precoder indication information of an uplink signal, wherein when the precoder indicated by the first indication information satisfies a first preset condition, the first indication information indicates a first uplink power control rule; and when the precoder indicated by the first indication information satisfies a second preset condition, the first indication information indicates a second uplink power control rule, the first preset condition and the second preset condition are different, and the first uplink power control rule is different from the second uplink power control rule.

Optionally, the first preset condition is that a sum of squares of magnitudes of elements in the precoding matrix is 1, and the second preset condition is that a sum of squares of magnitudes of elements in the precoding matrix is not equal to 1. Here, an element in the precoding matrix is understood to be an element multiplied by a scaling coefficient (or referred to as a scaling factor) in front of the precoding matrix. For example, assuming that the precoding matrix is $$\frac{1}{\sqrt{2}}\begin{bmatrix}1\\j\end{bmatrix},$$

the elements of the matrix are $1/\sqrt{2}$ and $j/\sqrt{2}$. Since the sum of the square of magnitudes of the two elements is 1, the precoder meets the first preset condition. As another example, assuming that the precoding matrix is $$\frac{1}{2}\begin{bmatrix}1\\j\end{bmatrix},$$

the elements of the matrix are $1/2$ and $j/2$, and the sum of the square of the magnitudes of the two elements is $1/4$, thus, the precoder meets the second preset condition.

Implementation Mode 5

A codebook of the uplink signal includes at least two codewords, positions of non-zero elements in the at least two codewords are the same, relative phase relationships between the non-zero elements are the same, and scaling factors for the non-zero elements are different. Here, a scaling factor refers to a coefficient in front of a matrix of a codeword. The first indication information includes or is precoder indication information of an uplink signal, wherein when the precoder indication information corresponds to different codewords of the at least two codewords, the precoder indication information indicates different uplink power control rules, and the different uplink power control rules include at least a first uplink power control rule and a second uplink power control rule.

For example, the first codeword of two precoded codewords is $$\frac{1}{\sqrt{2}}\begin{bmatrix}1\\j\end{bmatrix},$$

the second codeword of the two precoded codewords is $$\frac{1}{2}\begin{bmatrix}1\\j\end{bmatrix},$$

the scaling factor of the non-zero element of the first codeword is $$\frac{1}{\sqrt{2}},$$

and the scaling factor of the non-zero element of the second codeword is $1/2$. When the precoder indication information corresponds to the first codeword, the precoder indication information indicates the first uplink power control rule, and when the precoder indication information corresponds to the second codeword, the precoder indication information indicates the second uplink power control rule, where the first uplink power control rule may be different from the second uplink power control rule.

It should be noted that this implementation mode is also applicable to a case where the codebook also contains more codewords, such as a third codeword, the codewords (such as the third codeword, the first codeword and the second codeword) all include non-zero elements at the same position, and the relative phase relationships between the non-zero elements are the same, and the scaling factors are different.

An exemplary two-antenna single-stream codebook of PUSCH is shown in Table 2, where TPMI index=1 corresponds to the first codeword, and TPMI index=7 corresponds to the second codeword. When the TPMI indicated by the base station corresponds to TPMI index=1, a total transmission power of the uplink signal is 1/2 of the transmission power calculated according to the uplink power control calculation formula; and when the TPMI indicated by the base station corresponds to TPMI index=7, the total transmission power of the uplink signal is the transmission power calculated according to the uplink power control calculation formula.

Implementation Mode 6

The first indication information further indicates codebook subset restriction of the uplink signal.

Optionally, the first indication information includes or is indication information of codebook subset restriction of the uplink signal, and there is a correspondence relationship between information of codebook subset restriction and the uplink power control rule. Optionally, in the correspondence relationship, a value of codebook subset restriction information corresponds to one uplink power control rule, and one uplink power control rule corresponds to at least one value of codebook subset restriction information.

In this implementation mode, the first indication information includes or is codebook subset restriction indication information of the uplink signal (for example, the first indication information includes or is an RRC signaling codebooksubset), wherein, the uplink power control rule indicated by the codebook subset restriction indication information is an uplink power control rule corresponding to the codebook subset restriction indication information.

For example, candidate values of the codebook subset restriction indication information include at least a first candidate value and a second candidate value, and different candidate values correspond to different groups of codebook subsets. When the codebook subset restriction indication information corresponds to the first candidate value, the codebook subset restriction indication information corresponds to the first uplink power control rule. When the codebook subset restriction indication information corresponds to the second candidate value, the codebook subset restriction indication information corresponds to the second uplink power control rule. It should be noted that, the candidate values of the codebook subset restriction indication information may further include more values, such as a third candidate value, which respectively correspond to more uplink power control rules.

For example, the codebook subset restriction information of the uplink signal that may be indicated by the base station for the terminal is {Codebook subset restriction 1, Codebook subset restriction 2, Codebook subset restriction 3, Codebook subset restriction 4}; when the codebook subset restriction indication information indicates "Codebook subset restriction 1" or "Codebook subset restriction 2", the codebook subset restriction indication information corresponds to an uplink power control rule; when the codebook subset restriction indication information indicates "Codebook subset restriction 3" or "Codebook subset restriction 4", the codebook subset restriction indication information corresponds to another uplink power control rule.

Implementation Mode 7

The first indication information includes at least two states, wherein the at least two states respectively correspond to different uplink power control rules. First indication information of codebook subset restriction indicated by the base station may respectively correspond to different codebook subsets when the first indication information is in different states.

In the above step 32, the terminal may receive the codebook subset restriction indication information sent by the base station, the codebook subset restriction indication information indicates a first codebook subset restriction state, the terminal determines that the first codebook subset restriction state corresponds to first codebook subset restriction when the first indication information indicates the first state, and, determines that the first codebook subset restriction state corresponds to second codebook subset restriction when the first indication information indicates the second state, wherein the first codebook subset restriction is different from the second codebook subset restriction.

For example, the first indication information includes at least a first state and a second state, and the first state and the second state correspond to different uplink power control rules. When the first indication information is in the first state, first codebooksubset indicated by the base station corresponds to a first codebook subset; and when the first indication information is in the second state, the first codebooksubset indicated by the base station corresponds to a second codebook subset, the first codebook subset and the second codebook subset are different. Of course, some pieces of codebook subset restriction information may have the same codebook subset in the first state and the second state of the first indication information, which is not particularly limited in the embodiment of the present disclosure.

Taking the codebook of the above Table 2 as an example, it is assumed that the first state of the first indication information corresponds to an uplink power control rule 1, and the second state of the first indication information corresponds to an uplink power control rule 2. Assuming that codebook subset restriction codebooksubset indicated by the base station to the terminal is nonCoherent, and if the first indication information is in the first state, a codebook corresponding to the first codebook subset restriction is codewords for TPMI index=0, 1; and if the first indication information is in the second state, a codebook corresponding to the first codebook subset restriction is codewords for TPMI index=6, 7. The terminal determines, according to the uplink power control rule indicated by the first indication information, a precoder indicated by the precoder indication information transmitted for the uplink signal by the base station. Assuming that the "Bit field mapped to index" of the TPMI received by the terminal is 0, then if the first indication information is in the first state, the terminal considers that the precoding matrix is $$\frac{1}{\sqrt{2}}\begin{bmatrix}1\\0\end{bmatrix},$$

the uplink power control rule is a first uplink power control rule, and if the first indication information is in the second state, the terminal considers that the precoding matrix is $$\begin{bmatrix}1\\0\end{bmatrix},$$

and the uplink power control rule is a second uplink power control rule.

Implementation Mode 8

The first indication information includes or is precoder indication information of an uplink signal (for example, a precoder and transmission rank indicator in DCI), wherein, the uplink power control rule indicated by the precoder indication information is an uplink power control rule corresponding to a codeword group indicated by the precoder indication information. Optionally, each codeword group includes at least one codeword, and there is no overlapping codeword between different codeword groups.

For example, the codebook of the uplink signal includes at least a first codeword group and a second codeword group, and there is no overlapping codeword between different codeword groups. When the precoder indication information corresponds to the first codeword group, the precoder indication information corresponds to the first uplink power control rule; and when the precoder indication information corresponds to the second codeword group, the precoder indication information corresponds to the second uplink power control rule. It should be noted that this implementation mode is also applicable to the case where the codebook also includes a third codeword group or more codeword groups, for example, when the precoder indication information corresponds to the third codeword group, the precoder indication information may correspond to a third type of uplink power control rule, etc.

An exemplary two-antenna single-stream codebook of PUSCH is shown in Table 2 above, where TPMI indexes=0-5 correspond to the first codeword group, and TPMI indexes=6-7 correspond to the second codeword group. When a TPMI indicated by the base station is a codeword in the first codeword group, the total transmission power of the uplink signal is 1/2 of the transmission power calculated according to the uplink power control calculation formula; and when the TPMI indicated by the base station is a codeword in the second codeword group, the total transmission power of the uplink signal is the transmission power calculated according to the uplink power control calculation formula.

Implementation Mode 9

The first indication information includes at least two candidate values, wherein the at least two candidate values respectively correspond to different uplink power control rules; the first codebook subset restriction indication information indicated by the base station respectively correspond to different codebook subsets in case of different candidate values of the first indication information.

An example of this implementation mode is as follows.

When the first indication information is the first candidate value and the codebooksubset indicated by the base station is non-coherent, corresponding codebook subsets are TPMIs 0-1 in the Table 3; and when the first indication information is the second candidate value and the codebooksubset indicated by the base station is non-coherent, corresponding codebook subsets are TPMIs 0-2 in the Table 3.

Based on the above method, embodiments of the present disclosure also provide a device for implementing the above method.

Figure 5:
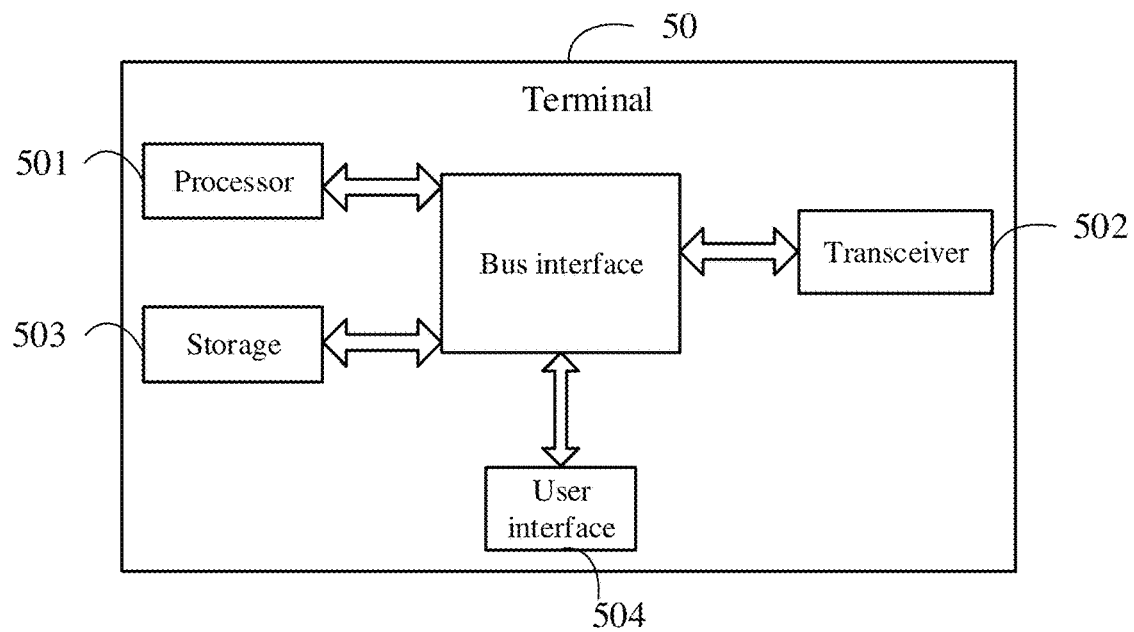
FIG. 5 is a schematic structural diagram of a terminal provided by an embodiment of the present disclosure.

Referring to FIG. 5, FIG. 5 is a schematic structural diagram of a terminal according to an embodiment of the present disclosure. The terminal 50 includes a processor 501, a transceiver 502, a storage 503, a user interface 504 and a bus interface, wherein, in an embodiment of the present disclosure, the terminal 500 further include a computer program stored on the storage 503 and executable by the processor 501.

The transceiver 502 is configured to receive first indication information sent by a base station, wherein the first indication information is used for indicating an uplink power control rule for an uplink signal.

The processor 501 is configured to read the program in the storage and execute the following: determining a transmission power of the uplink signal according to the uplink power control rule indicated by the first indication information. Optionally, the processor 501 is further configured to transmit the uplink signal by using the transmission power of the uplink signal.

In FIG. 5, a bus architecture may include any number of interconnected buses and bridges. Specifically, various circuits such as one or more processors represented by the processor 501 and a storage represented by the storage 503 are linked together. The bus architecture may also link together various other circuits, such as peripherals, voltage regulators, and power management circuits, all of which are well known in the art and thus will not be described further herein. A bus interface provides an interface. The transceiver 502 may be a plurality of elements, i.e., including a transmitter and a receiving, for providing means for communicating with various other devices over a transmission medium. For different user devices, a user interface 504 may also be an interface capable of externally interfacing with a desired device which includes, but is not limited to, a keypad, a display, a speaker, a microphone, a joystick, and the like.

The processor 501 is responsible for managing the bus architecture and general processing, and the storage 503 may store data used by the processor 501 in performing operations.

Optionally, the transceiver is further configured to, before receiving the first indication information, report an uplink power control rule supported by the terminal and/or a power amplifier (PA) capability of the terminal to the base station.

Optionally, the first indication information is indicated through at least one of an RRC signaling, a MAC-CE signaling, and DCI.

Optionally, the first indication information includes or is a dedicated signaling for indicating an uplink power control rule for an uplink signal, wherein the dedicated signaling includes at least two states, wherein, a first state of the dedicated signaling is used to indicate a first uplink power control rule, and a second state of the dedicated signaling is used to indicate a second uplink power control rule, the first uplink power control rule is different from the second uplink power control rule.

The processor is further configured to determine the transmission power of the uplink signal using the first uplink power control rule, in a case that the dedicated signaling is in the first state, and determine the transmission power of the uplink signal using the second uplink power control rule, in a case that the dedicated signaling is in the second state.

Optionally, the dedicated signaling is a 1-bit signaling.

Optionally, the first indication information is a state of an indication field or an indication parameter used for indicating a precoder and the number of layers of the uplink signal, and the first indication information is not used for indicating the precoder of the uplink signal.

The processor is further configured to determine a transmission power of the uplink signal according to the uplink power control rule corresponding to a current state of the indication field or indication parameter used for indicating the precoder and the number of layers of the uplink signal.

Optionally, the first indication information further indicates the precoding and/or the number of layers of the uplink signal.

Optionally, the first indication information includes or is precoder indication information of the uplink signal, wherein states of the first indication information include at least a first state and a second state, the first state is used to indicate a first uplink power control rule and a first precoder, and the second state is used to indicate a second uplink power control rule and a second precoder, the first uplink power control rule is different from the second uplink power control rule, and the first precoder is the same as or different from the second precoder.

The processor is further configured to determine the transmission power of the uplink signal according to the first uplink power control rule if the precoder indication information indicates the first state, and, determine the transmission power of the uplink signal according to the second uplink power control rule if the precoder indication information indicates the second state.

Optionally, the first indication information includes or is precoder indication information of an uplink signal, wherein when the precoder indicated by the first indication information satisfies a first preset condition, the first indication information indicates a first uplink power control rule; and when the precoder indicated by the first indication information satisfies a second preset condition, the first indication information indicates a second uplink power control rule, the first preset condition and the second preset condition are different, and the first uplink power control rule is different from the second uplink power control rule.

The processor is further configured to determine the transmission power of the uplink signal according to the first uplink power control rule when the precoder indicated by the first indication information satisfies the first preset condition, and, determine the transmission power of the uplink signal according to the second uplink power control rule when the precoder indicated by the first indication information satisfies the second preset condition.

Optionally, the first preset condition is that a sum of squares of magnitudes of elements in the precoding matrix is 1, and the second preset condition is that a sum of squares of magnitudes of elements in the precoding matrix is not equal to 1.

Optionally, a codebook of the uplink signal includes at least two codewords, positions of non-zero elements in the at least two codewords are the same, relative phase relationships between the non-zero elements are the same, and sums of squares of magnitudes of elements in matrixes of the at least two codewords are different.

The first indication information includes or is precoder indication information of an uplink signal, wherein when the precoder indication information indicates different codewords of the at least two codewords, the first indication information indicates different uplink power control rules.

The processor is further configured to: determine the transmission power of the uplink signal according to the first uplink power control rule when the first indication information indicates a first codeword of the at least two codewords, and, determine the transmission power of the uplink signal according to the second uplink power control rule when the first indication information indicates a second codeword of the at least two codewords, wherein the first uplink power control rule is different from the second uplink power control rule.

Optionally, the first indication information further indicates codebook subset restriction of the uplink signal.

Optionally, the first indication information includes or is indication information of codebook subset restriction of the uplink signal, and there is a correspondence relationship between information of codebook subset restriction and the uplink power control rule.

The processor is further configured to determine the transmission power of the uplink signal according to an uplink power control rule corresponding to codebook subset restriction indication information of the uplink signal.

Optionally, in the correspondence relationship, a value of codebook subset restriction information corresponds to one uplink power control rule, and one uplink power control rule corresponds to at least one value of codebook subset restriction information.

Optionally, the first indication information includes at least a first state and a second state, wherein the first state and the second state respectively correspond to different uplink power control rules.

The transceiver is further configured to receive the codebook subset restriction indication information sent by the base station, wherein the codebook subset restriction indication information indicates a first codebook subset restriction state. The processor is further configured to determine that the first codebook subset restriction state corresponds to first codebook subset restriction when the first indication information indicates the first state, and, determine that the first codebook subset restriction state corresponds to second codebook subset restriction when the first indication information indicates the second state, wherein the first codebook subset restriction is different from the second codebook subset restriction.

Optionally, candidate uplink power control rules include at least a first uplink power control rule and a second uplink power control rule, wherein, the first uplink power control rule is a predefined third uplink power control rule, and the second uplink power control rule is a predefined fourth uplink power control rule; or the first uplink power control rule is a predefined uplink power control rule, the second uplink power control rule is an uplink power control rule reported by the terminal or an uplink power control rule corresponding to the PA capability reported by the terminal.

For more detailed description of the implementation modes of the first indication information, reference may be made to a corresponding part of the method embodiments, which is not repeated here to avoid repetition.

Figure 6:
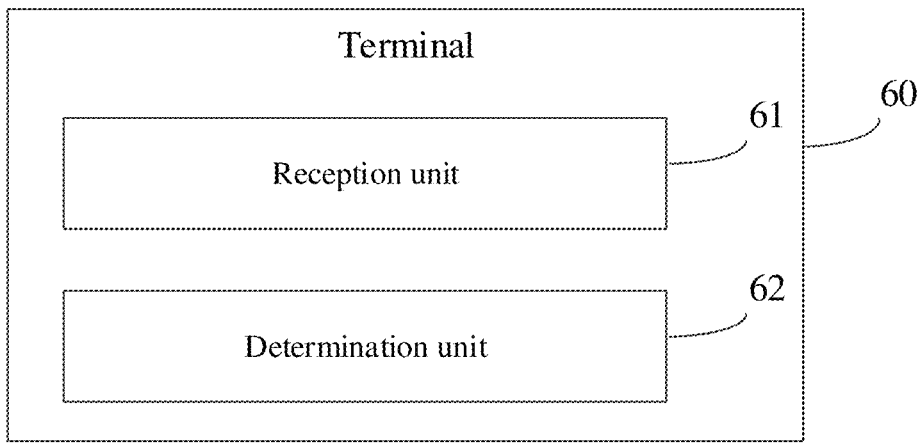
FIG. 6 is another structural diagram of a terminal provided by an embodiment of the present disclosure.

Referring to FIG. 6, the embodiment of the present disclosure provides another terminal 60. The terminal 60 includes a reception unit 61 and a determination unit 62.

The reception unit 61 is configured to receive first indication information sent by a base station, wherein the first indication information is used for indicating an uplink power control rule for an uplink signal.

The determination unit 62 is configured to determine a transmission power of the uplink signal according to the uplink power control rule indicated by the first indication information. Optionally, the determination unit 62 is further configured to transmit the uplink signal by using the transmission power of the uplink signal.

Optionally, the terminal further includes a sending unit configured to before receiving the first indication information, report an uplink power control rule supported by the terminal and/or a power amplifier (PA) capability of the terminal to the base station.

Optionally, the first indication information is indicated through at least one of an RRC signaling, a MAC-CE signaling, and DCI.

Optionally, the first indication information includes or is a dedicated signaling for indicating an uplink power control rule for an uplink signal, wherein the dedicated signaling includes at least a first state and a second state, wherein, the first state of the dedicated signaling is used to indicate a first uplink power control rule, and the second state of the dedicated signaling is used to indicate a second uplink power control rule, the first uplink power control rule is different from the second uplink power control rule.

The determination unit is further configured to: determine the transmission power of the uplink signal using the first uplink power control rule, in a case that the dedicated signaling is in the first state, and determine the transmission power of the uplink signal using the second uplink power control rule, in a case that the dedicated signaling is in the second state.

Optionally, the dedicated signaling is a 1-bit signaling.

Optionally, the first indication information is a state of an indication field or an indication parameter used for indicating a precoder and the number of layers of the uplink signal, and the first indication information is not used for indicating the precoder of the uplink signal.

The determination unit is further configured to determine a transmission power of the uplink signal according to the uplink power control rule corresponding to a current state of the indication field or indication parameter used for indicating the precoder and the number of layers of the uplink signal.

Optionally, the first indication information simultaneously indicates the precoder and/or the number of layers of the uplink signal.

Optionally, the first indication information includes or is precoder indication information of the uplink signal, wherein states of the first indication information include at least a first state and a second state, the first state is used to indicate a first uplink power control rule and a first precoder, and the second state is used to indicate a second uplink power control rule and a second precoder, the first uplink power control rule is different from the second uplink power control rule, and the first precoder is the same as or different from the second precoder.

The determination unit is further configured to determine the transmission power of the uplink signal according to the first uplink power control rule if the precoder indication information indicates the first state, and, determine the transmission power of the uplink signal according to the second uplink power control rule if the precoder indication information indicates the second state.

Optionally, the first indication information includes or is precoder indication information of an uplink signal, wherein when the precoder indicated by the first indication information satisfies a first preset condition, the first indication information indicates a first uplink power control rule; and when the precoder indicated by the first indication information satisfies a second preset condition, the first indication information indicates a second uplink power control rule, the first preset condition and the second preset condition are different, and the first uplink power control rule is different from the second uplink power control rule.

The determination unit is further configured to determine the transmission power of the uplink signal according to the first uplink power control rule when the precoder indicated by the first indication information satisfies the first preset condition, and, determine the transmission power of the uplink signal according to the second uplink power control rule when the precoder indicated by the first indication information satisfies the second preset condition.

Optionally, the first preset condition is that a sum of squares of magnitudes of elements in the precoding matrix is 1, and the second preset condition is that a sum of squares of magnitudes of elements in the precoding matrix is not equal to 1.

Optionally, a codebook of the uplink signal includes at least two codewords, positions of non-zero elements in the at least two codewords are the same, relative phase relationships between the non-zero elements are the same, and sums of squares of magnitudes of elements in matrixes of the at least two codewords are different.

The first indication information includes or is precoder indication information of an uplink signal, wherein when the precoder indication information indicates different codewords of the at least two codewords, the first indication information indicates different uplink power control rules.

The determination unit is further configured to: determine the transmission power of the uplink signal according to the first uplink power control rule when the first indication information indicates a first codeword of the at least two codewords, and, determine the transmission power of the uplink signal according to the second uplink power control rule when the first indication information indicates a second codeword of the at least two codewords, wherein the first uplink power control rule is different from the second uplink power control rule.

Optionally, the first indication information further indicates codebook subset restriction of the uplink signal.

Optionally, the first indication information includes or is indication information of codebook subset restriction of the uplink signal, and there is a correspondence relationship between information of codebook subset restriction and the uplink power control rule.

The determination unit is further configured to determine the transmission power of the uplink signal according to an uplink power control rule corresponding to codebook subset restriction indication information of the uplink signal.

Optionally, in the correspondence relationship, a value of codebook subset restriction information corresponds to one uplink power control rule, and one uplink power control rule corresponds to at least one value of codebook subset restriction information.

Optionally, the first indication information includes at least a first state and a second state, wherein the first state and the second state respectively correspond to different uplink power control rules.

The reception unit is further configured to receive the codebook subset restriction indication information sent by the base station, wherein the codebook subset restriction indication information indicates a first codebook subset restriction state. The determination unit is further configured to determine that the first codebook subset restriction state corresponds to first codebook subset restriction when the first indication information indicates the first state, and, determine that the first codebook subset restriction state corresponds to second codebook subset restriction when the first indication information indicates the second state, wherein the first codebook subset restriction is different from the second codebook subset restriction.

Optionally, candidate uplink power control rules include at least a first uplink power control rule and a second uplink power control rule, wherein, the first uplink power control rule is a predefined third uplink power control rule, and the second uplink power control rule is a predefined fourth uplink power control rule; or the first uplink power control rule is a predefined uplink power control rule, the second uplink power control rule is an uplink power control rule reported by the terminal or an uplink power control rule corresponding to the PA capability reported by the terminal.

Figure 7:
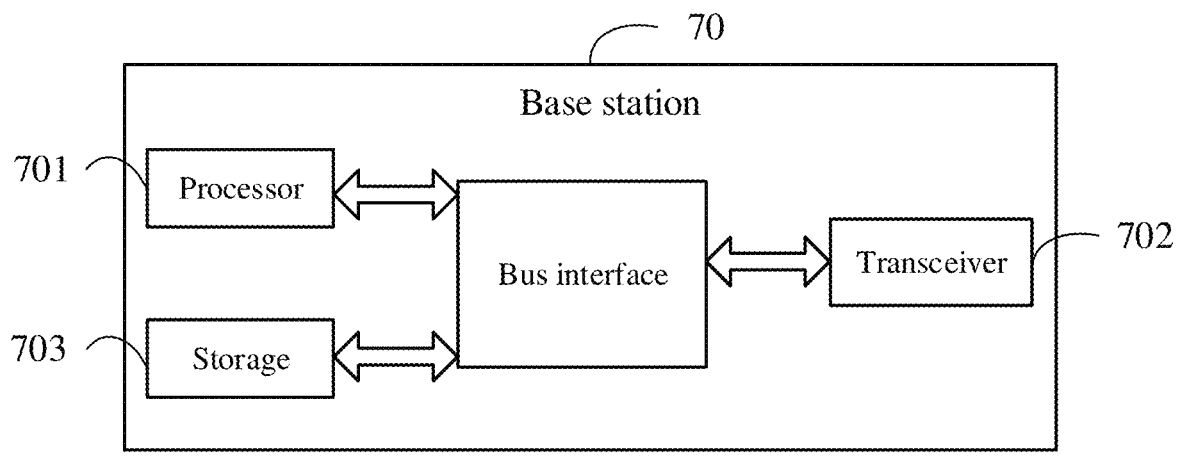
FIG. 7 is a schematic structural diagram of a base station provided by an embodiment of the present disclosure.

Referring to FIG. 7, an embodiment of the present disclosure provides a schematic structural diagram of a base station 700. The base station 700 includes a processor 701, a transceiver 702, a storage 703, and a bus interface, wherein, In an embodiment of the present disclosure, the base station 700 also includes a computer program stored on the storage 703 and executable by the processor 701.

The transceiver is configured to send first indication information to a terminal, wherein the first indication information is used for indicating an uplink power control rule for an uplink signal.

In FIG. 7, a bus architecture may include any number of interconnected buses and bridges. Specifically, various circuits such as one or more processors represented by the processor 701 and a storage represented by the storage 703 are linked together. The bus architecture may also link together various other circuits, such as peripherals, voltage regulators, and power management circuits, all of which are well known in the art and thus will not be described further herein. A bus interface provides an interface. The transceiver 702 may be a plurality of elements, i.e., including a transmitter and a receiver, for providing means for communicating with various other devices over a transmission medium.

The processor 701 is responsible for managing the bus architecture and general processing, and the storage 703 may store date used during operation of the processor 701.

Optionally, the transceiver is further configured to receive an uplink power control rule supported by the terminal and/or a Power Amplifier (PA) capability of the terminal reported by the terminal. The processor is configured to read the program in the storage and perform the following: determining an uplink power control rule for the uplink signal according to the uplink power control rule supported by the terminal and/or a power amplifier PA capability of the terminal.

Optionally, when the uplink power control rule supported by the terminal and/or the power amplifier PA capability of the terminal are different, ranges of values of the uplink power control rules, which can be indicated by the first indication information, of the uplink signal are different.

Optionally, ranges of values of the uplink power control rules, which can be indicated by the first indication information, of the uplink signal are a universal set or a subset of the uplink power control rules supported by the terminal and/or the uplink power control rules corresponding to the power amplifier PA capability of the terminal.

Optionally, the first indication information is indicated through at least one of an RRC signaling, a MAC-CE signaling, and DCI.

Optionally, the processor is further configured to determine uplink scheduling information of the uplink signal according to the uplink power control rule for the uplink signal indicated by the first indication information.

Optionally, the first indication information includes or is a dedicated signaling for indicating an uplink power control rule for an uplink signal, wherein the dedicated signaling includes at least a first state and a second state, wherein, a first state of the dedicated signaling is used to indicate a first uplink power control rule, and a second state of the dedicated signaling is used to indicate a second uplink power control rule, the first uplink power control rule is different from the second uplink power control rule.

Optionally, the dedicated signaling is 1-bit signaling.

Optionally, the first indication information is a state of an indication field or an indication parameter used for indicating a precoder and the number of layers of the uplink signal, and the first indication information is not used for indicating the precoder of the uplink signal.

Optionally, the first indication information simultaneously indicates the precoder and/or the number of layers of the uplink signal.

Optionally, the first indication information includes or is precoder indication information of the uplink signal, wherein the states of the first indication information include at least a first state and a second state, and the first state is used for indicating a first uplink power control rule and a first precoder, the second state is used to indicate a second uplink power control rule and a second precoder, the first uplink power control rule is different from the second uplink power control rule, and the first precoder is the same as or different from the second precoder.

Optionally, the first indication information includes or is precoder indication information of an uplink signal, wherein when the precoder indicated by the first indication information satisfies a first preset condition, the first indication information indicates a first uplink power control rule; and when the precoder indicated by the first indication information satisfies a second preset condition, the first indication information indicates a second uplink power control rule, the first preset condition and the second preset condition are different, and the first uplink power control rule is different from the second uplink power control rule.

Optionally, the first preset condition is that a sum of squares of magnitudes of elements in the precoding matrix is 1, and the second preset condition is that a sum of squares of magnitudes of elements in the precoding matrix is not equal to 1.

Optionally, a codebook of the uplink signal includes at least two codewords, positions of non-zero elements in the at least two codewords are the same, relative phase relationships between the non-zero elements are the same, and sums of squares of magnitudes of elements of matrixes of the at least two codewords are different.

The first indication information includes or is precoder indication information of an uplink signal, wherein when the precoder indication information indicates different codewords of the at least two codewords, the precoder indication information indicates different uplink power control rules.

Optionally, the first indication information further indicates codebook subset restriction of the uplink signal.

Optionally, the first indication information includes or is indication information of codebook subset restriction of the uplink signal, and there is a correspondence relationship between information of codebook subset restriction and the uplink power control rule.

Optionally, in the correspondence relationship, a value of codebook subset restriction information corresponds to one uplink power control rule, and one uplink power control rule corresponds to at least one value of codebook subset restriction information.

Optionally, the first indication information includes at least a first state and a second state, wherein the first state and the second state respectively correspond to different uplink power control rules. The transceiver is further configured to send codebook subset restriction indication information to the terminal, wherein the codebook subset restriction indication information indicates a first codebook subset restriction state, wherein when the first indication information indicates a first state, the first codebook subset restriction state corresponds to first codebook subset restriction, and when the first indication information indicates the second state, the first codebook subset restriction state corresponds to second codebook subset restriction, and the first codebook subset restriction is different from the second codebook subset restriction.

Optionally, candidate uplink power control rules include at least a first uplink power control rule and a second uplink power control rule, wherein, the first uplink power control rule is a predefined third uplink power control rule, and the second uplink power control rule is a predefined fourth uplink power control rule, or the first uplink power control rule is a predefined uplink power control rule, the second uplink power control rule is an uplink power control rule reported by the terminal or an uplink power control rule corresponding to the PA capability reported by the terminal.

For more detailed description of implementation modes of the first indication information, reference may be made to a corresponding part of the method embodiments, which is not repeated here to avoid repetition.

Figure 8:
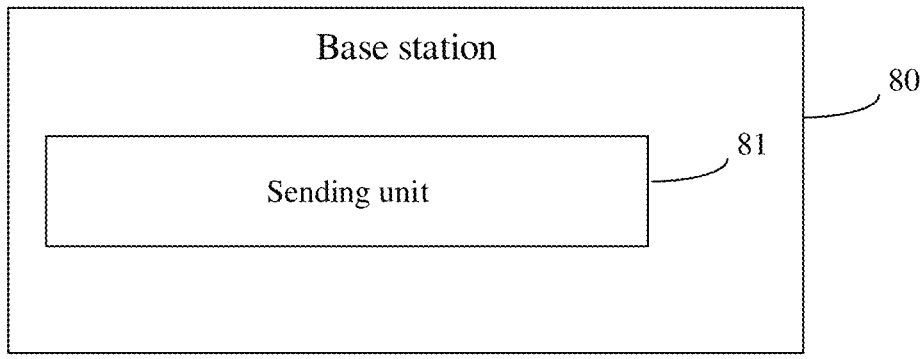
FIG. 8 is another schematic structural diagram of a base station provided by an embodiment of the present disclosure.

Referring to FIG. 8, the embodiment of the present disclosure provides another structure of a base station 80, as shown in FIG. 8. The base station 80 include a sending unit 81.

The sending unit 81 is configured to send first indication information to a terminal, wherein the first indication information is used for indicating an uplink power control rule for an uplink signal.

Optionally, the base station further includes a receiving unit and a determining unit.

The receiving unit is configured to receive, before sending the first indication information, an uplink power control rule supported by the terminal and/or a Power Amplifier (PA) capability of the terminal reported by the terminal.

The determining unit is configured to determine an uplink power control rule for the uplink signal according to the uplink power control rule supported by the terminal and/or the power amplifier PA capability of the terminal.

Optionally, when the uplink power control rule supported by the terminal and/or the power amplifier PA capability of the terminal are different, ranges of values of the uplink power control rules, which can be indicated by the first indication information, of the uplink signal are different.

Optionally, ranges of values of the uplink power control rules, which can be indicated by the first indication information, of the uplink signal are a universal set or a subset of the uplink power control rules supported by the terminal and/or the uplink power control rules corresponding to the power amplifier PA capability of the terminal.

Optionally, the first indication information is indicated through at least one of an RRC signaling, a MAC-CE signaling, and DCI.

Optionally, the determining unit is further configured to determine uplink scheduling information of the uplink signal according to the uplink power control rule for the uplink signal indicated by the first indication information.

Optionally, the first indication information includes or is a dedicated signaling for indicating an uplink power control rule for an uplink signal, wherein the dedicated signaling includes at least a first state and a second state, wherein, a first state of the dedicated signaling is used to indicate a first uplink power control rule, and a second state of the dedicated signaling is used to indicate a second uplink power control rule, the first uplink power control rule is different from the second uplink power control rule.

Optionally, the dedicated signaling is 1-bit signaling.

Optionally, the first indication information is a state of an indication field or an indication parameter used for indicating a precoder and the number of layers of the uplink signal, and the first indication information is not used for indicating the precoder of the uplink signal.

Optionally, the first indication information simultaneously indicates the precoder and/or the number of layers of the uplink signal.

Optionally, the first indication information includes or is precoder indication information of the uplink signal, wherein the states of the first indication information include at least a first state and a second state, and the first state is used for indicating a first uplink power control rule and a first precoder, the second state is used to indicate a second uplink power control rule and a second precoder, the first uplink power control rule is different from the second uplink power control rule, and the first precoder is the same as or different from the second precoder.

Optionally, the first indication information includes or is precoder indication information of an uplink signal, wherein when the precoder indicated by the first indication information satisfies a first preset condition, the first indication information indicates a first uplink power control rule; and when the precoder indicated by the first indication information satisfies a second preset condition, the first indication information indicates a second uplink power control rule, the first preset condition and the second preset condition are different, and the first uplink power control rule is different from the second uplink power control rule.

Optionally, the first preset condition is that a sum of squares of magnitudes of elements in the precoding matrix is 1, and the second preset condition is that a sum of squares of magnitudes of elements in the precoding matrix is not equal to 1.

Optionally, a codebook of the uplink signal includes at least two codewords, positions of non-zero elements in the at least two codewords are the same, relative phase relationships between the non-zero elements are the same, and sums of squares of magnitudes of elements of matrixes of the at least two codewords are different.

The first indication information includes or is precoder indication information of an uplink signal, wherein when the precoder indication information indicates different codewords of the at least two codewords, the precoder indication information indicates different uplink power control rules.

Optionally, the first indication information further indicates codebook subset restriction of the uplink signal.

Optionally, the first indication information includes or is indication information of codebook subset restriction of the uplink signal, and there is a correspondence relationship between information of codebook subset restriction and the uplink power control rule.

Optionally, in the correspondence relationship, a value of codebook subset restriction information corresponds to one uplink power control rule, and one uplink power control rule corresponds to at least one value of codebook subset restriction information.

Optionally, the first indication information includes at least a first state and a second state, wherein the first state and the second state respectively correspond to different uplink power control rules. The transceiver is further configured to send codebook subset restriction indication information to the terminal, wherein the codebook subset restriction indication information indicates a first codebook subset restriction state, wherein when the first indication information indicates a first state, the first codebook subset restriction state corresponds to first codebook subset restriction, and when the first indication information indicates the second state, the first codebook subset restriction state corresponds to second codebook subset restriction, and the first codebook subset restriction is different from the second codebook subset restriction.

Optionally, candidate uplink power control rules include at least a first uplink power control rule and a second uplink power control rule, wherein, the first uplink power control rule is a predefined third uplink power control rule, and the second uplink power control rule is a predefined fourth uplink power control rule, or the first uplink power control rule is a predefined uplink power control rule, the second uplink power control rule is an uplink power control rule reported by the terminal or an uplink power control rule corresponding to the PA capability reported by the terminal.

In addition, for the devices shown in FIGS. 5 to 8, implementation modes of the first indication may be obtained by referring to relevant description of the method above, which is not repeated for the purpose of avoiding repetition.

Those of ordinary skill in the art will appreciate that units and algorithm steps in various examples described in connection with the embodiments disclosed herein can be implemented in electronic hardware, or a combination of computer software and electronic hardware. Whether these functions are executed in a manner of hardware or software depends on a specific application and design constraint conditions of the technical solutions. One skilled in the art may implement the described functions using different methods for each particular application, but such implementation should not be considered to go beyond the scope of the present disclosure.

It will be apparent to those skilled in the art that for convenience and conciseness of description, reference may be made to corresponding steps in the foregoing method embodiments for specific operational procedures of the above described systems, devices and units, which are not repeated here.

In the embodiments provided herein, it should be understood that the disclosed device and method may be implemented in other ways. For example, the above-described embodiments of the device is only illustrative. For example, division of the units is only a logical functional division, and there may be another division manner in actual implementation. For example, multiple units or components may be combined or may be integrated into another system, or some features may be omitted or not performed. On the other hand, coupling or direct coupling or communication connection shown or discussed may be an indirect coupling or communication connection through interfaces, devices or units, and may be in a form of electrical, mechanical or other forms.

The units described as separate components may or may not be physically separated, components shown as the units may or may not be physical units, that is, may be located in one place, or may be distributed over a plurality of network elements. Some or all of the elements may be selected according to actual needs to achieve objectives of the embodiments of the present disclosure.

In addition, various functional units in each embodiment of the present disclosure may be integrated in one processing unit, or may be separately physically present, or two or more units may be integrated in one group.

The functions may be stored in a computer-readable storage medium if being implemented in a form of software functional units and sold or used as stand-alone products. Based on such understanding, an essential part, or a part contributing to prior art, of the technical solutions of the present disclosure or a part of the technical solution may be embodied in the form of a software product, the computer software product is stored in a storage medium and includes instructions for causing a computer device (which may be a personal computer, a server, or a network device or the like) to perform all or part of the steps of the method described in various embodiments of the present disclosure. The storage medium includes various media capable of storing program codes, such as a USB disk, a portable hard disk, a ROM, a RAM, a magnetic disk, or an optical disk.

The above description is only a specific embodiment of the present disclosure, but the protection scope of the present disclosure is not limited thereto, any person familiar with the technical field may obtain variations or substitutions within the technical scope of the present disclosure, all of the variations or substitutions are included within the protection scope of the present disclosure. Accordingly, the protection scope of the present disclosure should accord to the protection scope of the claims.

What is claimed is:
1. An uplink power control method performed by a terminal, comprising:
receiving first indication information sent by a base station, wherein the first indication information is used to indicate an uplink power control rule for an uplink signal;
determining a transmission power of the uplink signal according to the uplink power control rule indicated by the first indication information,
wherein,
the first indication information is a state of an indication field or an indication parameter used for indicating a precoder and the number of layers of the uplink signal, and the first indication information is not used to indicate a precoder of the uplink signal; or
the first indication information comprises precoder indication information of the uplink signal, wherein states of the first indication information comprise a first state or a second state, the first state is used to indicate a first uplink power control rule and a first precoder, and the second state is used to indicate a second uplink power control rule and a second precoder, the first uplink power control rule is different from the second uplink power control rule, and the first precoder is the same as or different from the second precoder; or
the first indication information comprises precoder indication information of the uplink signal; when a precoder indicated by the first indication information satisfies a first preset condition, the first indication information indicates a first uplink power control rule; and when a precoder indicated by the first indication information satisfies a second preset condition, the first indication information indicates a second uplink power control rule, the first preset condition and the second preset condition are different, and the first uplink power control rule is different from the second uplink power control rule; or
a codebook of the uplink signal comprises at least two codewords, positions of non-zero elements in the at least two codewords are the same, relative phase relationships between the non-zero elements are the same, and sums of squares of magnitudes of elements in matrixes of the at least two codewords are different; the first indication information comprises precoder indication information of the uplink signal, wherein when the precoder indication information indicates different codewords of the at least two codewords, the first indication information indicates different uplink power control rules; or
the first indication information comprises a first state or a second state, the first state and the second state respectively correspond to different uplink power control rules, and the first codebook subset restriction state corresponds to first codebook subset restriction when the first indication information indicates the first state, and the first codebook subset restriction state corresponds to second codebook subset restriction when the first indication information indicates the second state, wherein the first codebook subset restriction is different from the second codebook subset restriction; or
candidate uplink power control rules comprise at least a first uplink power control rule and a second uplink power control rule, wherein, the first uplink power control rule is a predefined third uplink power control rule, and the second uplink power control rule is a predefined fourth uplink power control rule; or the first uplink power control rule is a predefined uplink power control rule, the second uplink power control rule is an uplink power control rule reported by the terminal or an uplink power control rule corresponding to a Power Amplifier (PA) capability reported by the terminal, wherein the method further comprises:
receiving indication information of codebook subset restriction sent by the base station, wherein the indication information of codebook subset restriction indicates a first codebook subset restriction state.

2. The method according to 1, wherein before receiving the first indication information, the method further comprises:
reporting an uplink power control rule supported by the terminal and/or a Power Amplifier (PA) capability of the terminal to the base station.

3. The method according to claim 1, wherein, in case that the first indication information is the state of the indication field or the indication parameter used for indicating the precoder and the number of layers of the uplink signal, and the first indication information is not used to indicate the precoder of the uplink signal,
determining the transmission power of the uplink signal, comprises:
determining the transmission power of the uplink signal according to an uplink power control rule corresponding to a current state of the indication field or indication parameter used for indicating the precoder and the number of layers of the uplink signal.

4. The method according to claim 1, wherein, the first indication information further indicates a precoder and/or the number of layers of the uplink signal.

5. The method according to claim 1, wherein, in case that the first indication information comprises precoder indication information of the uplink signal, determining the transmission power of the uplink signal, comprises:
determining the transmission power of the uplink signal according to the first uplink power control rule if the precoder indication information indicates the first state; or,
determining the transmission power of the uplink signal according to the second uplink power control rule if the precoder indication information indicates the second state.

6. The method according to claim 1, wherein, in case that the first indication information comprises the precoder indication information of the uplink signal and when the precoder indicated by the first indication information satisfies the first preset condition, the first indication information indicates a first uplink power control rule;
determining the transmission power of the uplink signal comprises:
determining the transmission power of the uplink signal according to the first uplink power control rule when the precoder indicated by the first indication information satisfies the first preset condition; or,
determining the transmission power of the uplink signal according to the second uplink power control rule when the precoder indicated by the first indication information satisfies the second preset condition.

7. The method according to claim 1, wherein, in case that the codebook of the uplink signal comprises at least two codewords, the positions of non-zero elements in the at least two codewords are the same, the relative phase relationships between the non-zero elements are the same, and the sums of squares of magnitudes of elements in matrixes of the at least two codewords are different;
determining the transmission power of the uplink signal comprises:
determining the transmission power of the uplink signal according to the first uplink power control rule when the first indication information indicates a first codeword of the at least two codewords; and,
determining the transmission power of the uplink signal according to the second uplink power control rule when the first indication information indicates a second codeword of the at least two codewords, wherein the first uplink power control rule is different from the second uplink power control rule.

8. The method according to claim 1, wherein, the first indication information further indicates codebook subset restriction of the uplink signal.

9. The method according to claim 8, wherein, the first indication information comprises indication information of codebook subset restriction of the uplink signal, and there is a correspondence relationship between indication information of codebook subset restriction and an uplink power control rule;
determining the transmission power of the uplink signal comprises:
determining the transmission power of the uplink signal according to an uplink power control rule corresponding to the indication information of codebook subset restriction of the uplink signal.

10. An uplink power control method performed by a base station, comprising:
sending first indication information to a terminal, wherein the first indication information is used to indicate an uplink power control rule for an uplink signal,
wherein,
the first indication information is a state of an indication field or an indication parameter used for indicating a precoder and the number of layers of the uplink signal, and the first indication information is not used to indicate a precoder of the uplink signal; or
the first indication information comprises precoder indication information of the uplink signal, wherein states of the first indication information comprise a first state or a second state, the first state is used to indicate a first uplink power control rule and a first precoder, and the second state is used to indicate a second uplink power control rule and a second precoder, the first uplink power control rule is different from the second uplink power control rule, and the first precoder is the same as or different from the second precoder; or
the first indication information comprises precoder indication information of the uplink signal; when a precoder indicated by the first indication information satisfies a first preset condition, the first indication information indicates a first uplink power control rule; and when a precoder indicated by the first indication information satisfies a second preset condition, the first indication information indicates a second uplink power control rule, the first preset condition and the second preset condition are different, and the first uplink power control rule is different from the second uplink power control rule; or
a codebook of the uplink signal comprises at least two codewords, positions of non-zero elements in the at least two codewords are the same, relative phase relationships between the non-zero elements are the same, and sums of squares of magnitudes of elements in matrixes of the at least two codewords are different; the first indication information comprises precoder indication information of the uplink signal, wherein when the precoder indication information indicates different codewords of the at least two codewords, the first indication information indicates different uplink power control rules; or the first indication information comprises a first state or a second state, the first state and the second state respectively correspond to different uplink power control rules, and the first codebook subset restriction state corresponds to first codebook subset restriction when the first indication information indicates the first state, and the first codebook subset restriction state corresponds to second codebook subset restriction when the first indication information indicates the second state, wherein the first codebook subset restriction is different from the second codebook subset restriction; or candidate uplink power control rules comprise at least a first uplink power control rule and a second uplink power control rule, wherein, the first uplink power control rule is a predefined third uplink power control rule, and the second uplink power control rule is a predefined fourth uplink power control rule; or the first uplink power control rule is a predefined uplink power control rule, the second uplink power control rule is an uplink power control rule reported by the terminal or an uplink power control rule corresponding to a Power Amplifier (PA) capability reported by the terminal, wherein, the method further comprises:

sending indication information of codebook subset restriction to the terminal, wherein the indication information of codebook subset restriction indicates a first codebook subset restriction state.

11. The method according to claim 10, wherein before sending the first indication information, the method further comprises:

receiving an uplink power control rule supported by the terminal and/or a Power Amplifier (PA) capability of the terminal reported by the terminal;

determining the uplink power control rule for the uplink signal according to the uplink power control rule supported by the terminal and/or the PA capability of the terminal.

12. The method according to claim 10, further comprising:

determining uplink scheduling information of the uplink signal according to the uplink power control rule for the uplink signal indicated by the first indication information.

13. The method according to claim 10, wherein, the first indication information further indicates a precoder and/or the number of layers of the uplink signal.

14. The method according to claim 10, wherein, the first indication information further indicates codebook subset restriction of the uplink signal.

15. A base station, comprising:

a transceiver, a storage, a processor and a program stored on the storage and executable by the processor;

wherein the processor is configured to execute the program to control the transceiver to perform steps of the uplink control method according to claim 10.

16. A terminal, comprising:

a transceiver, a storage, a processor, and a program stored on the storage and executable by the processor;

the transceiver is configured to receive first indication information sent by a base station, wherein the first indication information is used to indicate an uplink power control rule for an uplink signal;

the processor is configured to read the program in the storage and perform following: determining a transmission power of the uplink signal according to the uplink power control rule indicated by the first indication information, wherein, the first indication information is a state of an indication field or an indication parameter used for indicating a precoder and the number of layers of the uplink signal, and the first indication information is not used to indicate a precoder of the uplink signal; or the first indication information comprises precoder indication information of the uplink signal, wherein states of the first indication information comprise a first state or a second state, the first state is used to indicate a first uplink power control rule and a first precoder, and the second state is used to indicate a second uplink power control rule and a second precoder, the first uplink power control rule is different from the second uplink power control rule, and the first precoder is the same as or different from the second precoder; or the first indication information comprises precoder indication information of the uplink signal; when a precoder indicated by the first indication information satisfies a first preset condition, the first indication information indicates a first uplink power control rule; and when a precoder indicated by the first indication information satisfies a second preset condition, the first indication information indicates a second uplink power control rule, the first preset condition and the second preset condition are different, and the first uplink power control rule is different from the second uplink power control rule; or a codebook of the uplink signal comprises at least two codewords, positions of non-zero elements in the at least two codewords are the same, relative phase relationships between the non-zero elements are the same, and sums of squares of magnitudes of elements in matrixes of the at least two codewords are different; the first indication information comprises precoder indication information of the uplink signal, wherein when the precoder indication information indicates different codewords of the at least two codewords, the first indication information indicates different uplink power control rules; or the first indication information comprises a first state or a second state, the first state and the second state respectively correspond to different uplink power control rules, and the first codebook subset restriction state corresponds to first codebook subset restriction when the first indication information indicates the first state, and the first codebook subset restriction state corresponds to second codebook subset restriction when the first indication information indicates the second state, wherein the first codebook subset restriction is different from the second codebook subset restriction; or candidate uplink power control rules comprise at least a first uplink power control rule and a second uplink power control rule, wherein, the first uplink power control rule is a predefined third uplink power control rule, and the second uplink power control rule is a predefined fourth uplink power control rule; or the first uplink power control rule is a predefined uplink power control rule, the second uplink power control rule is an uplink power control rule reported by the terminal or an uplink power control rule corresponding to a Power Amplifier (PA) capability reported by the terminal, wherein the processor is configured to read the program in the storage and further perform following:

receiving indication information of codebook subset restriction sent by the base station, wherein the indication information of codebook subset restriction indicates a first codebook subset restriction state.

* * * * *